United States Patent
Sugizaki et al.

(10) Patent No.: US 8,964,697 B2
(45) Date of Patent: Feb. 24, 2015

(54) CONNECTION MANAGEMENT METHOD, CONNECTION MANAGEMENT SYSTEM, MOBILE TERMINAL, PACKET DATA GATEWAY AND MOBILE MANAGEMENT GATEWAY

(75) Inventors: Ryuji Sugizaki, Tokyo (JP); Shinkichi Ikeda, Kanagawa (JP); Keigo Aso, Kanagawa (JP); Jun Hirano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 235 days.

(21) Appl. No.: 13/381,861

(22) PCT Filed: Jun. 23, 2010

(86) PCT No.: PCT/JP2010/004164
§ 371 (c)(1),
(2), (4) Date: Dec. 30, 2011

(87) PCT Pub. No.: WO2011/001628
PCT Pub. Date: Jan. 6, 2011

(65) Prior Publication Data
US 2012/0113959 A1 May 10, 2012

(30) Foreign Application Priority Data
Jul. 3, 2009 (JP) .................................. 2009-158875

(51) Int. Cl.
*H04W 4/00* (2009.01)
*H04W 36/00* (2009.01)
(Continued)

(52) U.S. Cl.
CPC ....... *H04W 36/0016* (2013.01); *H04L 61/1511* (2013.01); *H04L 61/2007* (2013.01); *H04W 8/26* (2013.01)
USPC ............ 370/331; 370/332; 370/333; 370/334

(58) Field of Classification Search
USPC .................................................. 370/331–334
See application file for complete search history.

(56) References Cited

U.S. PATENT DOCUMENTS

| 8,391,235 | B2 * | 3/2013 | Park ............................. 370/331 |
| 2010/0040021 | A1 | 2/2010 | Aso |

(Continued)

FOREIGN PATENT DOCUMENTS

| JP | 2008-519568 | 6/2008 |
| WO | 2006/052563 | 5/2006 |

(Continued)

OTHER PUBLICATIONS

Uday Narayanan and Jiang Xie, Signaling Cost Analysis of Handoffs in a Mixed IPv4/IPv6 Environment, 2007, IEEE GLOBECOM, pp. 1792-1796.*

(Continued)

*Primary Examiner* — Hassan Kizou
*Assistant Examiner* — Abdullahi Ahmed
(74) *Attorney, Agent, or Firm* — Dickinson Wright PLLC

(57) ABSTRACT

When a mobile terminal transmitting/receiving a packet using a plurality of IP address types performs a handover to an access network (single address type connection network) permitting transmission/reception of a packet using a single IP address only, an IP address not permitted is unfortunately discarded at an access network as a handover destination. Disclosed is a technique configured so that a mobile terminal (UE 1) detecting a handover to the single address type connection network establishes a temporary connection with a mobility management gateway (PGW 5) and thereafter acquires an address of an ePDG 8 located at a core network and informs the ePDG of a communication state before the handover via a PDN using the temporary connection. The ePDG informs the PGW of the communication state of the UE before the handover. Thereby, the communication state of the UE before the handover is achieved with the PGW via the ePDG and the PDN.

19 Claims, 17 Drawing Sheets

(51) Int. Cl.
*H04L 29/12* (2006.01)
*H04W 8/26* (2009.01)

(56) References Cited

U.S. PATENT DOCUMENTS

| | | | |
|---|---|---|---|
| 2010/0067381 A1 | 3/2010 | Hirano | |
| 2010/0074179 A1 | 3/2010 | Akiyoshi | |
| 2010/0103876 A1 | 4/2010 | Aso | |
| 2010/0315973 A1 | 12/2010 | Hirano | |
| 2011/0211558 A1* | 9/2011 | Ikeda et al. | 370/331 |
| 2013/0142172 A1* | 6/2013 | Parsons et al. | 370/331 |

FOREIGN PATENT DOCUMENTS

| | | |
|---|---|---|
| WO | 2008/078633 | 7/2008 |
| WO | 2008/099857 | 8/2008 |
| WO | 2008/105176 | 9/2008 |
| WO | 2008/114498 | 9/2008 |
| WO | 20081126357 | 10/2008 |

OTHER PUBLICATIONS

International Search Report dated Aug. 17, 2010.

3GPP TS 23.401 V9.0.0, "3rd Generation Partnership Project; Technical Specification Group Services and System Aspects; General Packet Radio Service (GPRS) enhancements for Evolved Universal Terrestrial Radio Access Network (E-UTRAN) access (Release 9)," Mar. 2009, pp. 1-224.

3GPP TS 23.402 V9.0.0, "3$^{rd}$ Generation Partnership Project; Technical Specification Group Services and System Aspects; Architecture enhancements for non-3GPP accesses (Release 9)," Mar. 2009, pp. 1-191.

* cited by examiner

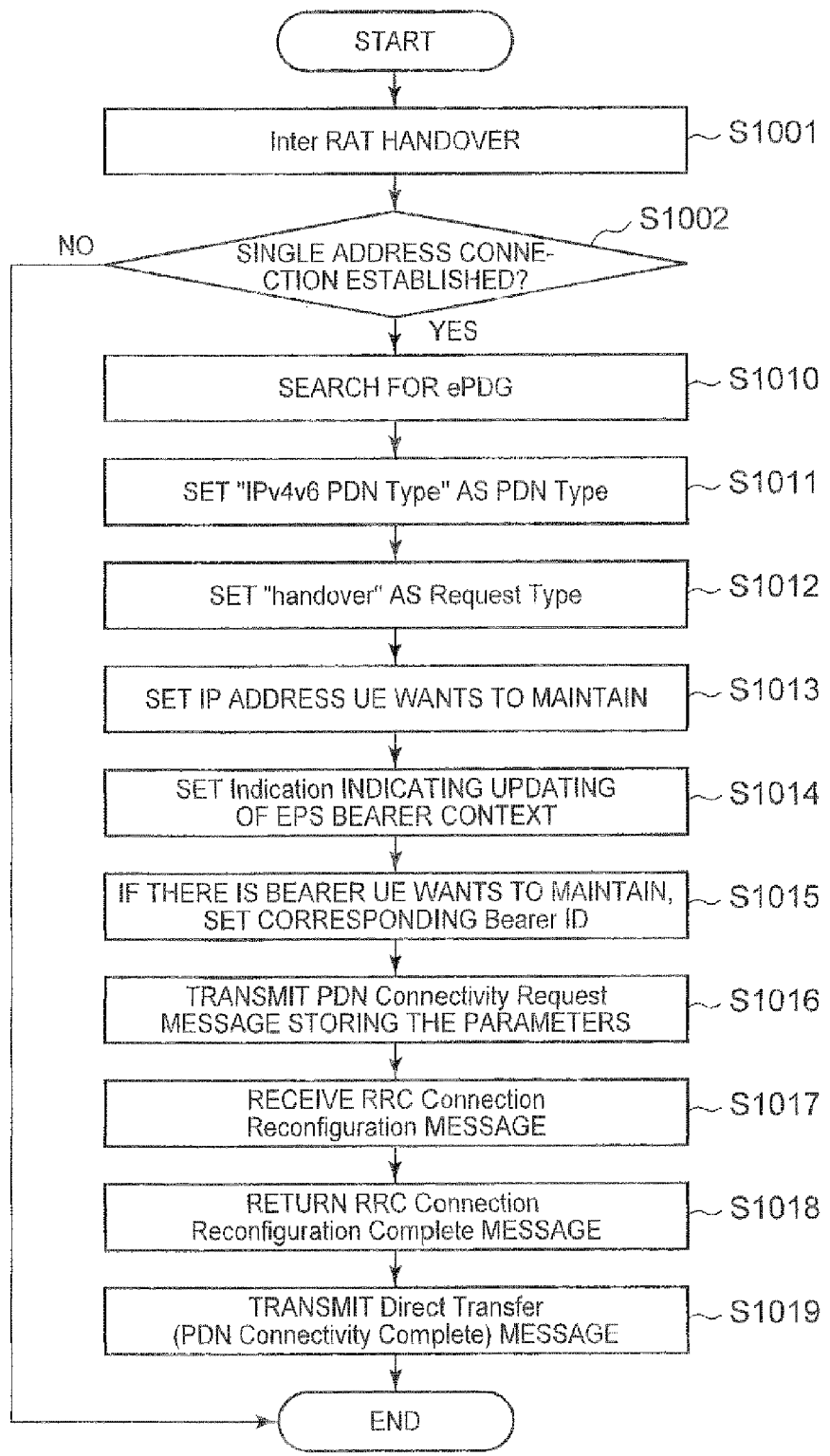

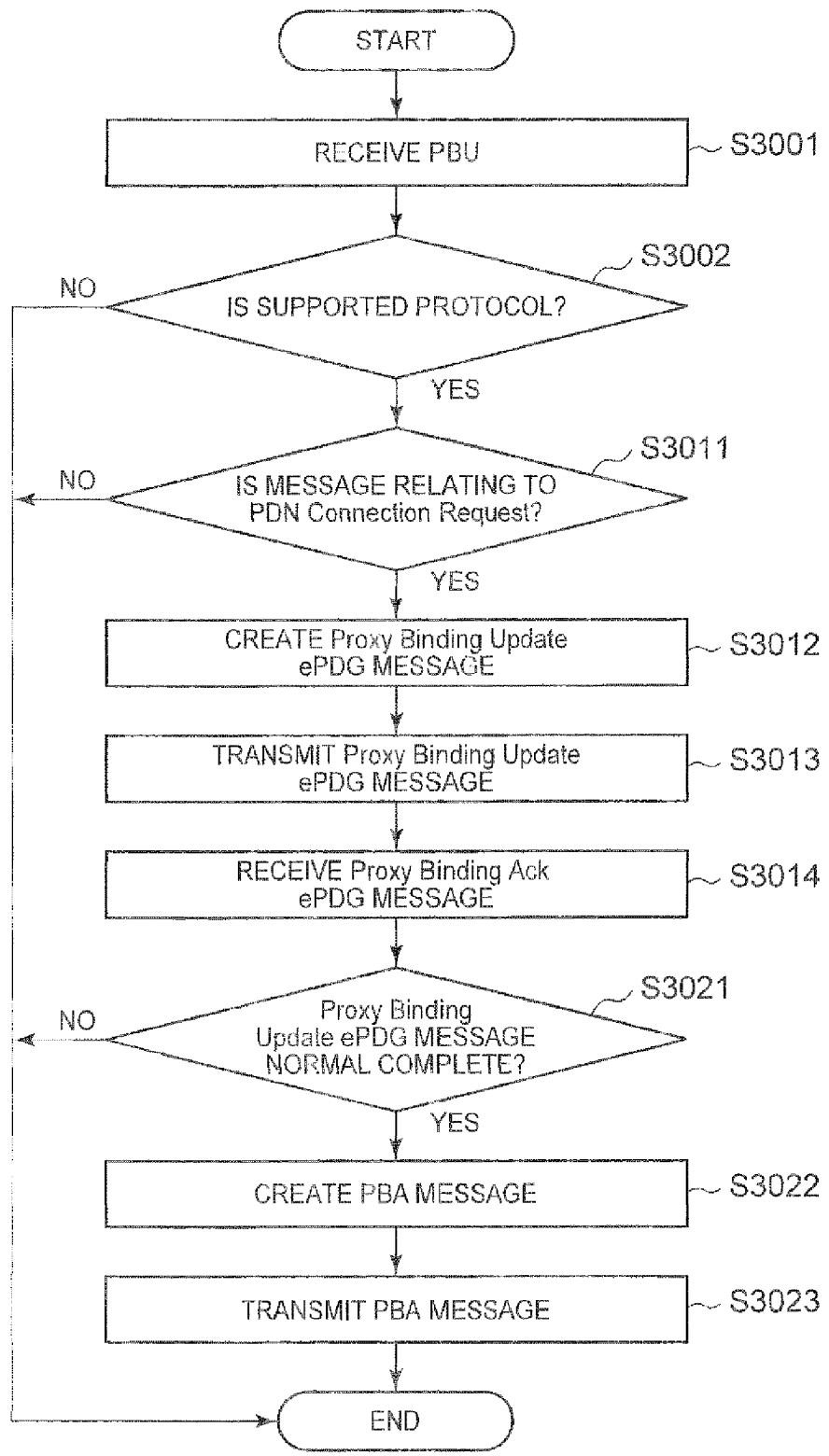

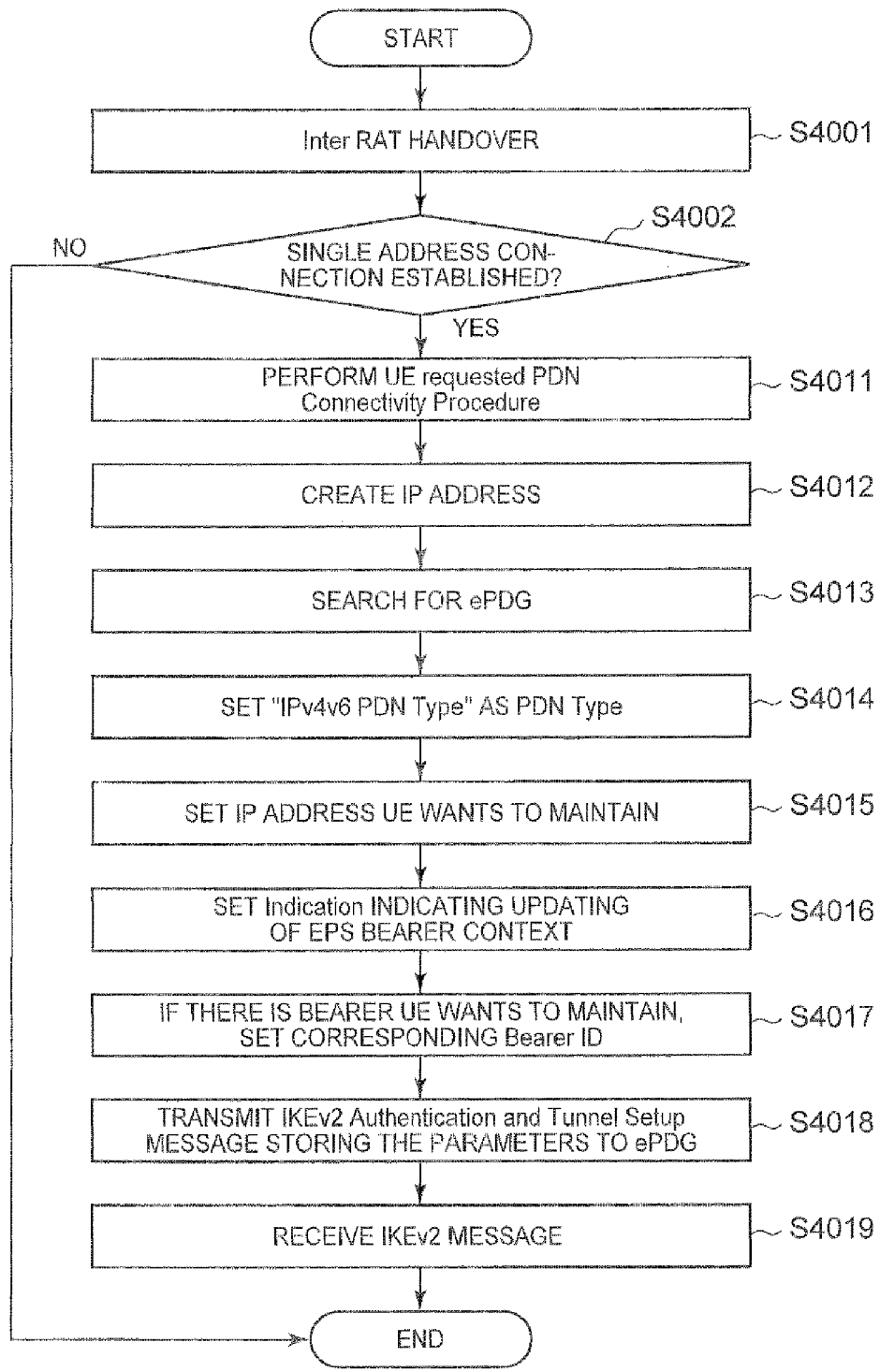

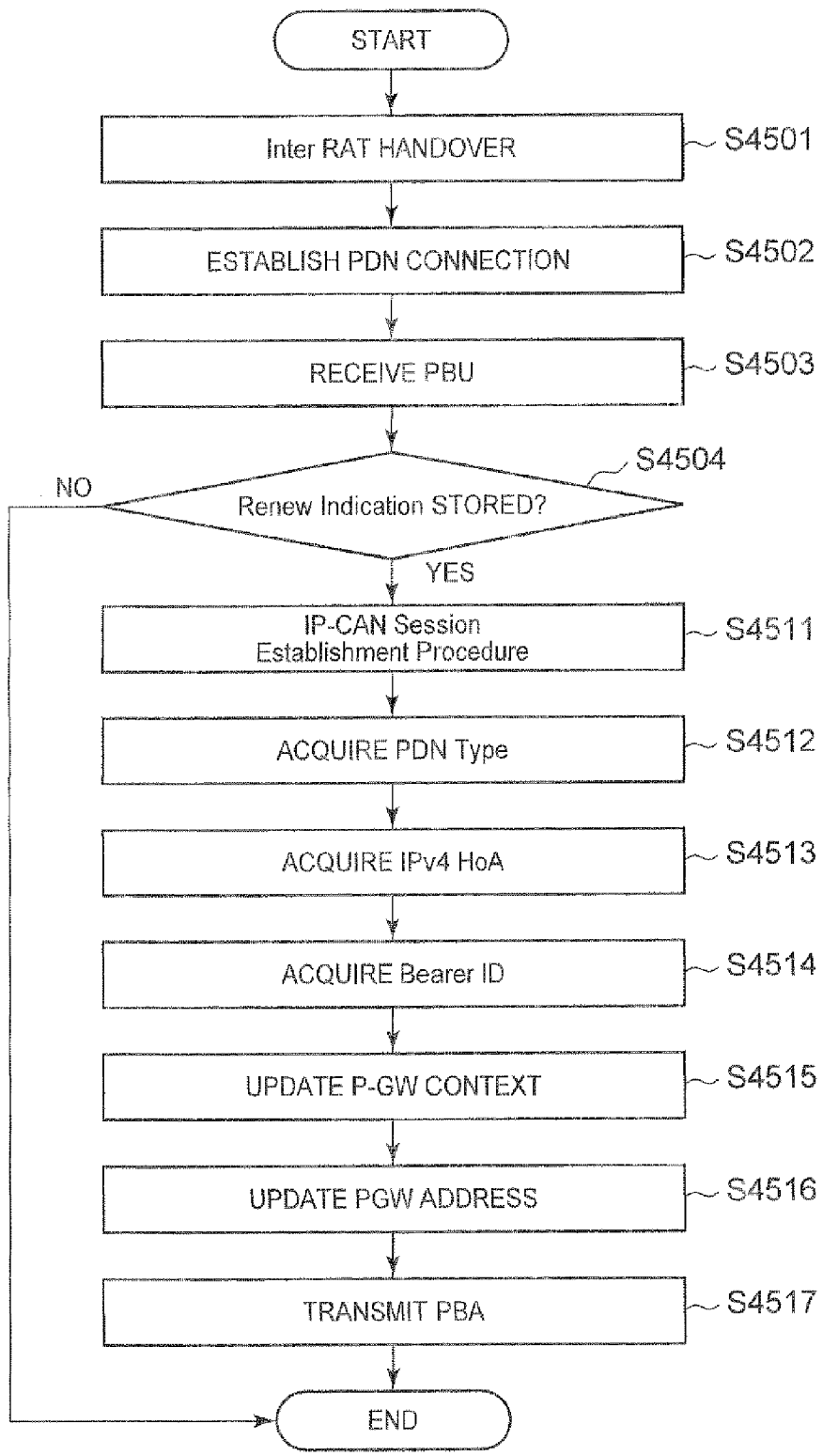

CONNECTION MANAGEMENT METHOD, CONNECTION MANAGEMENT SYSTEM, MOBILE TERMINAL, PACKET DATA GATEWAY AND MOBILE MANAGEMENT GATEWAY

TECHNICAL FIELD

The present invention relates to techniques enabling a communication node during a communication using an IP (Internet Protocol) in a communication environment using a plurality of types of addresses (e.g., IPv4 (Internet Protocol version 4) addresses and IPv6 (Internet Protocol version 6) addresses) to perform a handover to a network providing a single address type only while keeping a PDN (Packet Data network) connection communicable with the plurality of types of addresses configured before the handover.

BACKGROUND ART

Known techniques to secure migration transparency of a UE (User Equipment) in an IP network include GTP (GPRS Tunneling Protocol) on a 3GPP (Third Generation Partnership Project) access network and DSMIP (Dual Stack Mobile IP) on a Non-3GPP access network. As such techniques, PMIP (Proxy Mobile IP) also is known, which can be used on the access networks supporting 3GPP as well as on the access networks supporting Non-3GPP (refer to the following Non-Patent Document 1 and Non-Patent Document 2).

FIG. 1 shows an exemplary configuration of a communication network using PMIP. FIG. 1 shows the configuration including a UE 1 (User Equipment, which may be called a mobile node (MN) also), a MME 7 (Mobility Management Entity) to perform mobility management of the UE 1, a base station (eNB (eNode B) not shown) to transmit data to the UE 1 by radio waves, a SGW 6 (Serving Gateway, which may be called a MAG (Mobility Anchor Gateway) or the like in PMIP) to perform user data path control between base stations, a PGW 5 (Packet Gateway, which may be called a home agent (HA) in DSMIP, a local mobility anchor (LMA) in PMIP or the like) to assign an address to the UE 1 and to perform user data path control with the SGW 6, an ePDG 8 (evolved Packet Data Gateway) having a function to establish a PDN connection in a Non-3GPP access network 3 and functioning to protect a packet with the UE 1 during transmission/reception to/from the UE 1 and a DNS (Domain Name System) server 9 to hold a set of a URI (Universal Resource Identifier) and an IP address of the ePDG 8. Although FIG. 1 does not explicitly show the connection form of the DNS server 9, the DNS server 9 is accessible from a core network 4 and each access network (a 3GPP access network 2 and the Non-3GPP access network 3).

In FIG. 1, when the UE 1 performs a communication with a foreign network via the 3GPP access network 2 and the core network 4, a PDN connection has to be established between the UE and the PGW. The UE 1 acquires an IPv4 address (this may be called an IPv4 home address, an IPv4 HoA or the like) assigned by the PGW or an IPv6 prefix (this may be called an IPv6 home prefix or the like) during the establishment of the PDN connection to establish an EPS bearer (Evolved Packet System Bearer) communicable with the foreign network. When PMIP is applied for the establishing procedure of the PDN connection, the SGW 6 uses a proxy binding update (hereinafter called PBU) message to inform the PGW 5 of local information (e.g., the address of the SGW) on the location of the UE 1. Thereby, the PGW 5 creates a binding cache entry (hereinafter called BCE) that is the association of the reported information on the location of the UE 1 (hereinafter called positional information) with the already allocated IPv4 home address, IPv6 home prefix or the like and holds the BCE in a binding cache (hereinafter called a BC).

When an IPv6 prefix is allocated from the PGW 5, the UE 1 creates, from the allocated IPv6 prefix, an IPv6 address with the procedure specified by IETF (Internet Engineering Task Force), i.e., IP address automatic creation procedure or the like. This IPv6 address is called an IPv6 home address, an IPv6 HoA or the like. The PGW 5 refers to the BCE to check the destination address of the received packet addressed to the UE 1 (i.e., the IPv4 home address or the IPv6 home address) against an IP address registered in the BCE. When a result of the checking shows a corresponding BCE, the PGW 5 fetches positional information of the UE 1 corresponding to the IP address registered in the BCE and transfers a packet to the UE 1 via the SGW 6. That is to say, even when a network to be connected is changed, the SGW 6 informs the PGW 5 of network information on the current location of the UE 1 or the like and the PGW 5 registers (updates) a BCE, whereby the UE 1 can receive a message addressed to the HoA of the UE 1 correctly even after a handover of networks. In general, the SGW 6 transmits a PBU message regularly in accordance with an operator policy for network management or at the time of a handover followed by the movement of the UE 1.

Further, the UE 1 can have HoAs of different IP versions at the same time (e.g., IPv6 HoA (or IPv6 prefix) and IPv4 HoA) and the UE 1 can transmit/receive a packet using each HoA. For instance, when the UE 1 already acquires the IPv4 HoA and the IPv6 HoA and is in a state of capable of transmitting/receiving a packet with the PGW 5 using each HoA, the UE 1 has a PDN connection of an IPv4v6 PDN type (PDN type) with the PGW 5. Alternatively, the UE 1 can have a PDN connection of IPv4 PDN type and a PDN connection of IPv6 PDN type, and can transmit/receive a packet using each HoA. Information on such PDN connections of the UE 1 is stored in EPS bearer context that the MME 7 or the SGW 6 has or P-GW context that the PGW 5 has. A packet is transmitted/received between the UE 1 and each device on the basis of these contexts.

Further, when the UE 1 having a PDN connection of IPv4v6 PDN Type and in a state of transmitting/receiving a packet performs a handover to a network supporting a PDN connection of IPv4v6 PDN type, such EPS bearer context or P-GW context is used. Thereby, even after the handover, the UE 1 maintains the PDN connection of IPv4v6 PDN Type and can transmit/receive a packet using bearer corresponding to the IPv4 HoA and the IPv6 HoA.

PRIOR ART DOCUMENT

Non-Patent Document

Non-Patent Document 1: 3GPP TS 23.401 V9.0.0, March 2009

Non-Patent Document 2: 3GPP TS 23.402 V9.0.0, March 2009

However, when a UE in a state of a communication with a foreign network using a plurality of address types (having an IPv4 HoA and an IPv6 HoA and establishing a PDN connection of IPv4v6 PDN Type) moves to another network followed by a handover, there may be a case where only a single PDN type (IPv4 PDN type or IPv6 PDN type) is permitted depending on the policy of an operator managing the network after the movement. This includes, in addition to a decision based on the operator policy, the case of a 3GPP access network in a generation where the concept of IPv6 addresses does not exist, i.e., IPv4 addresses only are used for operation or the operation of IPv6 does not start. In the case of an operator providing a service supposing global addresses, the operator may support not IPv4 and but IPv6 only. Therefore, even when a communication path enabling transmission/reception of a packet using the IPv4 HoA and the IPv6HoA in a PDN connection exists before handover, and when a network as a handover destination permits IPv6 PDN Type only (such a network may be called a single address type connection supporting network, a single address type connection network or a single address type network), the address type of the PDN connection will be changed on the network side from the IPv4v6 PDN type to the IPv6 PDN type during the procedure of the handover processing, and the transmission/reception of a packet using the IPv4 HoA will fail.

Further, at this time, information on the IPv4 HoA that the UE acquired before the handover will be deleted from the context that each device has. As a result, when a handover is performed again to a multi-address type connection supporting network (e.g., a network capable of establishing the IPv4v6 PDN type, such a network may be called a multi-address type connection network or a multi-address connection network), the UE has to acquire the IPv4 HoA again and reestablish a communication path (EPS bearer or PDN connection) through which a packet can be transmitted/received using the acquired IPv4 HoA.

The following considers a method to cope with a problem occurring when such a UE having the IPv4 HoA and the IPv6 HoA and holding a PDN connection of IPv4v6 PDN Type performs a handover to a single address type connection supporting network, and a PDN connection of IPv6 PDN Type is allocated to the UE based on an operator policy. That is, the following method is to implement transmission/reception of a packet using the IPv4 HoA, aside from the communication using the IPv6 HoA, even after the handover to the single address type connection supporting network.

That is to say, when the UE having a PDN connection of IPv4v6 PDN Type performs a handover to a network supporting a single address type connection only, the change of the PDN connection to IPv6 PDN Type is detected. Subsequently, aside from the PDN connection of IPv6 PDN Type, an establishment request for a PDN connection of IPv4 PDN Type is newly sent to the PGW. After establishing the PDN connection, a packet can be transmitted/received using the IPv4 HoA.

According to such a method, however, the PDN connection of IPv4 PDN type that the UE requests may be denied by the policy of the operator managing the PGW. Thus the method results in the possibility of a failure in transmission/reception of a packet using the IPv4 HoA that is used before the handover.

The present specification assumes the case where when a UE having a PDN connection of IPv4v6 PDN Type performs a handover to a single address type connection supporting network, an IPv4 HoA is abandoned on the network side and an IPv6 HoA only is maintained, i.e., the case where the PDN connection is changed from the IPv4v6 PDN Type to the IPv6 PDN Type. However, not the IPv6 HoA but the IPv4 HoA may be maintained depending on the operator policy. In such a case, not the IPv4 HoA but the IPv6 HoA may be discarded, and as a result the PDN connection may be changed from the IPv4v6 PDN type to the IPv4 PDN Type.

SUMMARY OF THE INVENTION

In view of the above-stated problems, it is an object of the present invention to allow a UE already establishing a PDN connection of IPv4v6 PDN Type with a PGW and in a state of transmitting/receiving a packet using an IPv4 HoA and an IPv6 HoA to maintain a PDN connection of IPv4v6 PDN Type of the UE and transmit/receive a packet using the IPv4 HoA and the IPv6 HoA even after a handover of the UE to a single address type connection supporting network. It is another object of the present invention to make each device on a network side hold information on the IP addresses (IPv4 HoA and IPv6 HoA) of the UE, whereby a communication session using these addresses can be maintained without the need of special processing even after a handover performed again.

In order to fulfill the above-stated objects, the present invention provides a connection management method in a communication system including a mobile terminal capable of establishing a plurality of packet data connections using a plurality of IP addresses; a packet data gateway establishing a packet data connection with the mobile terminal and a mobility management gateway managing connection information on a packet transmission/reception with the mobile terminal, a connection management method of the present invention is for managing connections when the mobile terminal performs a handover from a multi-address type connection network capable of establishing a packet exchange connection using a plurality of IP address types to a single address type connection network capable of establishing a communication path with a single IP address type only, the method comprising:

a detection step of detecting, by the mobile terminal, a handover from the multi-address type connection network to the single address type connection network;

a temporary connection establishment step of establishing, by the mobile terminal, on a basis of a result of the detection step, a temporary connection with the mobility management gateway to maintain a communication state before the handover;

a packet gateway-to request transmission step of transmitting, by the mobile terminal, after the temporary connection establishment step, a request to maintain a packet data connection before the handover to the packet data gateway using the temporary connection;

a mobility management gateway-to request transmission step of determining, by the packet data gateway receiving the request, whether or not to transmit the received request to the mobility management gateway, and when the packet data gateway determines that the request is to be transmitted to the mobility management gateway, transmitting the received request to the mobility management gateway; and a modification step of modifying, by the mobility management gateway, the connection information on a packet transmission/reception with the mobile terminal on a basis of information included in the request.

This configuration allows a mobile terminal, even when the mobile terminal performs a handover from a multi-address type connection supporting network to a single address type connection supporting network, to maintain a connection used in the multi-address type connection supporting network even after the handover.

In order to fulfill the above-stated objects, the present invention also provides a connection management system comprising a mobile terminal capable of establishing a plurality of packet data connections using a plurality of IP addresses; a packet data gateway establishing a packet data connection with the mobile terminal and a mobility management gateway managing connection information on a packet transmission/reception with the mobile terminal, wherein the mobile terminal comprises:

detection means for enabling the mobile terminal to detect a handover from a multi-address type connection network capable of establishing a packet exchange connection using a plurality of IP address types to a single address type connection network capable of establishing a communication path with a single IP address type only;

temporary connection establishment means for enabling the mobile terminal to establish, on a basis of a result of the detection means, a temporary connection with the mobility management gateway to maintain a communication state before the handover; and packet gateway-to request transmission means for enabling the mobile terminal to transmit, after the temporary connection is established, a request to maintain a packet data connection before the handover to the packet data gateway using the temporary connection;

wherein the packet data gateway comprises:

reception means for receiving a request that the mobile terminal transmits;

determination means for determining whether or not to transmit the received request to the mobility management gateway; and mobility management gateway-to transmission means for transmitting, when the determination means determines that the received request is to be transmitted, the received request to the mobility management request, wherein the mobility management gateway comprises:

reception means for receiving a request that the packet gateway transmits; and modification means for modifying connection information on a packet transmission/reception with the mobile terminal on a basis of information included in the received request.

This configuration allows a mobile terminal, even when the mobile terminal performs a handover from a multi-address type connection supporting network to a single address type connection supporting network, to maintain a connection used in the multi-address type connection supporting network even after the handover.

In order to fulfill the above-stated objects, the present invention provides a mobile terminal capable of establishing a plurality of packet data connections using a plurality of IP addresses, the mobile terminal comprising:

detection means for detecting a handover from a multi-address type connection network capable of establishing a packet exchange connection using a plurality of IP address types to a single address type connection network capable of establishing a communication path with a single IP address type only;

temporary connection establishment means for establishing, on a basis of a result of the detection means, a temporary connection with a mobility management gateway to maintain a communication state before the handover, the mobility management gateway managing connection information on a packet transmission/reception with the mobile terminal; and packet gateway-to request transmission means for transmitting, after the temporary connection is established, a request to maintain a packet data connection before the handover to a packet data gateway using the temporary connection, the packet data gateway establishing a packet data connection with the mobile terminal.

This configuration allows a mobile terminal, even when the mobile terminal performs a handover from a multi-address type connection supporting network to a single address type connection supporting network, to maintain a connection used in the multi-address type connection supporting network even after the handover.

In order to fulfill the above-stated objects, the present invention provides a packet data gateway establishing a packet data connection with a mobile terminal capable of establishing a plurality of packet data connections using a plurality of IP addresses, the packet data gateway comprising:

reception means for receiving a request that the mobile terminal transmits;

determination means for determining whether or not to transmit the received request to a mobility management gateway managing connection information on a packet transmission/reception with the mobile terminal; and mobility management gateway-to transmission means for transmitting, when the determination means determines that the received request is to be transmitted, the received request to the mobility management gateway.

This configuration allows a mobile terminal, even when the mobile terminal performs a handover from a multi-address type connection supporting network to a single address type connection supporting network, to maintain a connection used in the multi-address type connection supporting network even after the handover.

In order to fulfill the above-stated objects, the present invention provides a mobility management gateway managing connection information on a packet transmission/reception with a mobile terminal capable of establishing a plurality of packet data connections using a plurality of IP addresses, the mobility management gateway comprising:

reception means for receiving a request that a packet gateway transmits, the packet gateway establishing a packet data connection with the mobile terminal; and modification means for modifying connection information on a packet transmission/reception with the mobile terminal on a basis of information included in the received request.

This configuration allows a mobile terminal, even when the mobile terminal performs a handover from a multi-address type connection supporting network to a single address type connection supporting network, to maintain a connection used in the multi-address type connection supporting network even after the handover.

According to the present invention, even when a UE having a PDN connection of IPv4v6 PDN Type and in a state of a communication with a foreign network using a plurality of addresses (e.g., IPv4 HoA and IPv6 HoA) performs a handover to a network supporting a single address type connection, the UE establishes a temporary PDN connection with a PGW for mapping of a communication state before the handover and thereafter performs PDN connection request procedure to the PGW via the PDN and an ePDG existing on a core network using the established temporary PDN connection. Thereby, the UE can establish a PDN connection using an IP version other than the single IP version allocated from the PGW. That is, even after the handover to the single address type connection supporting network, the UE can establish a PDN connection of IPv4v6 PDN Type. As a result, even after the handover, the UE can maintain the IPv4 HoA and the IPv6 HoA held before the handover and can transmit/receive a packet using each HoA.

Even after the handover, the UE is allowed to maintain the IPv4 HoA and the IPv6 HoA held before the handover, and therefore even when the UE performs a handover again, the UE can continuously use each HoA used before the handover without the need of any new processing.

BRIEF DESCRIPTION OF THE DRAWINGS

FIG. 10 is a flowchart showing an exemplary processing flow by a mobile terminal (UE) in Embodiment 1 of the present invention.

FIG. 15 is a flowchart showing an exemplary processing flow by an ePDG in Embodiment 1 of the present invention.

FIG. 19 is a flowchart showing an exemplary processing flow by a mobile terminal (UE) in Embodiment 4 of the present invention.

FIG. 20 is a flowchart showing an exemplary processing flow by a PGW in Embodiments 3 and 4 of the present invention.

DESCRIPTION OF EMBODIMENTS

Figure 1:
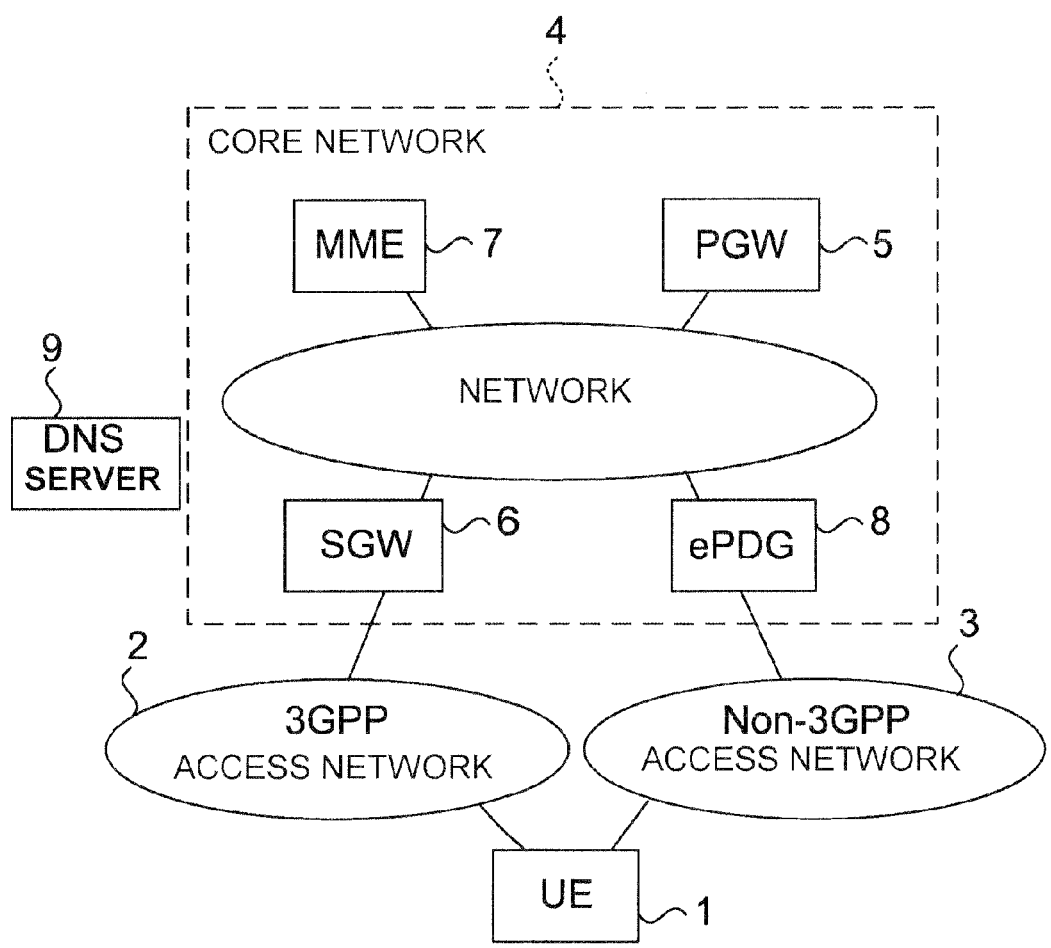
FIG. 1 is an exemplary communication system configuration common to Embodiments 1 to 4 of the present invention and the conventional techniques.

The following describes Embodiments 1 to 4 of the present invention, with reference to the drawings. Firstly, referring to FIG. 1, a system configuration common to Embodiments 1 to 4 of the present invention is described below. FIG. 1 shows an exemplary system configuration relating to Embodiments 1 to 4 of the present invention. A communication system shown in FIG. 1 includes at least a UE 1, a core network 4 to which the UE 1 connects, a PGW 5 managing a home prefix, a home address, positional information and the like of the UE 1, a MME 7 performing mobility management of the UE 1, a SGW 6 controlling a base station (this may be called an eNodeB as well, not shown) to transmit data to the UE 1 by radio waves, an ePDG 8 establishing SA (Security Association) with the UE 1 to protect a packet for transmitting data to the UE 1 over an Untrusted Non-3GPP access network 3, a DNS server 9 providing an address of the ePDG 8 in response to a request from the UE 1, a 3GPP access network 2 (hereinafter called a 3G access 2) and the Non-3GPP access network 3 (hereinafter called a N3G access 3).

The UE 1 has at least one communication interface, supports IPv4 and IPv6, uses each IP appropriately, and can establish a PDN connection of IPv4v6 PDN Type supporting both IP versions with the PGW 5 via the 3G access 2/N3G access 3. The ePDG 8 originally is a device required to establish SA to protect a packet when the UE 1 performs a communication over the Untrusted N3G access 3. Whereas a communication from the 3G access 2 while protecting a packet can be performed via the core network.

The 3G access 2 includes devices specific to a 3GPP system, such as a SGSN and a GGSN to support a function letting the UE 1 establish a connection with the PGW 5. FIG. 1, however, omits the illustration of these devices. The N3G access 3 also includes communication nodes (an AR (Access Router) and an MAG) to support a function required to let the UE 1 establish a connection with the PGW 5. FIG. 1 omits the illustration of these communication nodes as well.

In the communication system having such a configuration, it is premised that the UE 1 already establishes a PDN connection of an IPv4v6 PDN Type with the PGW via the 3G access 2 using PMIP and transmits/receives a packet using an IPv4 HoA and an IPv6 HoA. Note here that a connection of the UE 1 is not limited to the connection using PMIP, and the UE 1 may connect to the 3G access 2 using GTP and the like.

Embodiment 1

Figure 2:
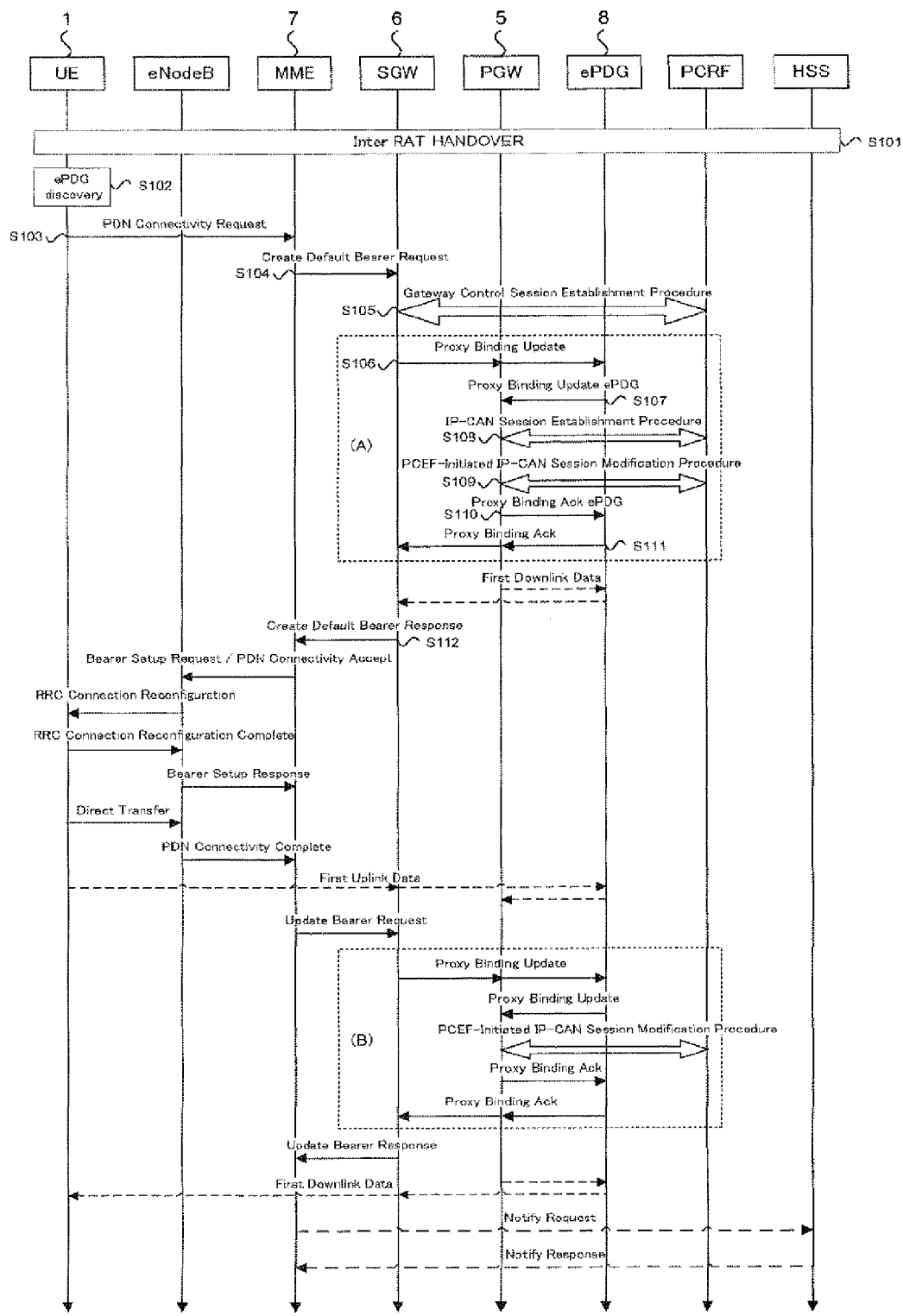
FIG. 2 is a sequence chart describing an exemplary operation of a multi-address connection establishment method in a single address type network in Embodiment 1 of the present invention.

Referring to FIG. 2, the following is a detailed description of an exemplary system operation in Embodiment 1 of the present invention. FIG. 2 is a sequence diagram to describe an exemplary system operation in Embodiment 1 of the present invention. FIG. 2 shows an exemplary processing sequence performed by at least a UE 1, an eNodeB (hereinafter called an eNB) directly transmitting/receiving a packet with the UE 1, a MME 7 performing mobility management of the UE 1, a SGW 6 controlling the eNB, a PGW 5 controlling the SGW 6 and playing a role as a gateway to the PDN to manage positional information on the UE 1, an ePDG 8 as a constitution element having a function to establish a PDN connection at an Untrusted N3G access 3, a PCRF (Policy Charging Rules Function) managing accounting control of the UE 1 and the like and a HSS (Home Subscriber Server) holding and managing subscription information of the UE 1 and the like. When other constitution elements performing the respective functions are available, such elements may be used.

FIG. 2 assumes the case where the UE has a PDN connection of an IPv4v6 PDN Type, is in a state capable of transmitting/receiving a packet addressed to the IPv4 HoA and the IPv6 HoA, and following a handover to a network (single address type network) supporting a single address connection only, an IPv6 PDN Type is allocated to the UE.

FIG. 2 shows a sequence enabling transmission/reception of a packet addressed to the IPv4 HoA while maintaining the IPv4 HoA acquired before the handover. When the UE 1 is about to leave a packet transfer area that the eNB covers, or when a different network is allocated to the UE 1 in accordance with the operator policy, the eNB with which the UE 1 currently connects starts handover processing to an access network as a handover destination (refer to Non-Patent Document 1 described above).

The UE 1 establishes a PDN connection of an IPv4v6 PDN Type with the PGW 5 before the handover and can transmit/receive a packet using the IPv4 HoA and the IPv6 HoA. As a result of the handover to the single address type network, however, the PDN Type is changed from the IPv4v6 PDN type to the IPv6 PDN Type based on the operator policy of the network as the handover destination. That is, a packet addressed to the IPv4 HoA that the UE 1 used before the handover is discarded on the network side, and a packet addressed to the IPv4 HoA will not be transferred. The UE 1 further cannot transmit a packet having the IPv4 HoA as a source address to the network side (Step S101: Inter RAT handover).

Embodiment 1 describes the case where the PDN connection type is changed from the IPv4v6 PDN Type to the IPv6 PDN Type and a packet addressed to the IPv4 HoA is discarded. Depending on the operator policy, however, the PDN connection type may be changed to the IPv4 PDN Type and a packet addressed to the IPv6 HoA may be discarded. The present invention is applicable to such a case also, and can achieve the desired objects by the method similar to the method described in the present embodiment.

After the handover at Step S101 (e.g., Inter RAT (Radio Access Technology) handover), the UE 1 detects a change of the PDN Type and makes an inquiry about the address of the ePDG 8 to the DNS server 9, for example, to implement processing to receive a packet addressed to the IPv4 HoA used before the handover (so as not to discard a bearer corresponding to the IPv4 HoA) (Step S102: ePDG Discovery). Although the UE 1 makes an inquiry to the DNS server 9 to acquire the ePDG address in this example, the UE 1 may store the address of the ePDG 8 during the connection with the N3G access 3, and may reuse such address information.

Subsequently, the UE 1 establishes a PDN connection of the IPv4v6 PDN Type with the PGW 5 via the ePDG 8 corresponding to the address of the ePDG 8 acquired the above step S102. The UE 1 performs the procedure while setting the destination address in the IP header of a message used for a conventional UE_Requested_PDN_Connectivity_Procedure (refer to the above Non-Patent Document 1 or Non-Patent Document 2) as the ePDG 8 (Step S103: PDN Connectivity Request). If the message of the UE_Requested_PDN_Connectivity_Procedure is delivered to the ePDG 8, the address of the ePDG 8 may be stored in a part other than the IP header.

Herein, the ePDG 8 is used because the transmission of a request message to establish a PDN connection of the IPv4v6 PDN Type to the PGW 5 via the ePDG 8 allows the UE 1 to establish a PDN connection without depending on the operator policy of the handover (HO) destination network (e.g., supporting the IPv6 PDN Type PDN connection only). The request is transmitted from the UE 1 to the ePDG 8 because the ePDG 8 has a function to establish a PDN connection of the IPv4v6 PDN Type and therefore the addition of new functions can be minimized. If any constitution element having a function to establish a PDN connection of the IPv4v6 PDN Type is available, such an element may be used instead of the ePDG.

Figure 8:
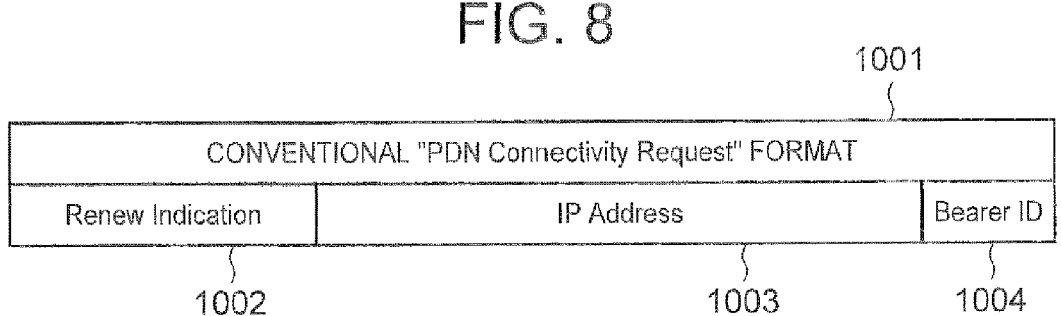
FIG. 8 shows an exemplary format of a PDN Connectivity Request message as a PDN connection request that a mobile terminal (UE) sends to a MME in Embodiment 1 of the present invention.

FIG. 8 shows an exemplary PDN Connectivity Request message that the UE 1 sends to the MME 7 at Step S103 of FIG. 2. The UE 1 provides a Renew Indication field 1002, an IP Address field 1003 and a Bearer ID field 1004 in addition to a conventional and standard PDN Connectivity Request message 1001, and can inform the MME 7 of the respective predetermined values. The information may be added to PCO (Protocol Configuration Options) specified by a standard PDN Connectivity Request message to inform the MME 7 of the information. Note here that this message may be a message other than the PDN Connectivity Request message as long as the message can transfer predetermined information.

At this time, the UE 1 sets IPv4v6 PDN Type as the PDN Type parameter of the PDN Connectivity Request message, handover as the Request Type, a Renew Indication value indicating updating of EPS bearer context that the PGW has in the Renew Indication field 1002, the IPv4 HoA that is not allocated after the handover in the IP Address field 1003, and when there is a bearer to be maintained, a Bearer ID corresponding to the bearer in the Bearer ID field 1004. Note here that when the IPv4 HoA used before the handover can be maintained and a packet addressed to the IPv4 HoA can be transmitted/received by simply storing IPv4v6 as the PDN Type parameter for notification, there is no need to transmit an added parameter. The same goes for other parameters.

Subsequently, receiving the PDN Connectivity Request message transmitted from the UE 1 at the above Step S103, the MME 7 performs the conventional processing (refer to the above Non-Patent Document 1). For instance, the MME 7 performs processing such as setting of a Dual Address Bearer Flag based on the PDN Type stored in such a PDN Connectivity Request message. Thereafter, the MME 7 transmits a Create Default Bearer Request message including a result of the processing to the SGW 6 (Step S104: Create Default Bearer Request).

Receiving the Create Default Bearer Request message, the SGW 6 performs Gateway Control Session Establishment Procedure with the PCRF similarly to typical UE requested PDN connectivity procedure (Step S105: Gateway Control Session Establishment Procedure) (refer to the above Non-Patent Document 2).

After the completion of the Gateway Control Session Establishment Procedure at Step S105, when the IP address of the UE cannot be acquired, FIG. 2 (A) (Step S106 to Step S111) is performed. When FIG. 2 (A) (Step S106 to Step S111) is performed, FIG. 2 (B) is not performed. When the SGW can acquire the IP address of the UE as a result of the Gateway Control Session Establishment Procedure, the SGW does not perform FIG. 2 (A) (Step S106 to Step S111) but performs FIG. 2 (B).

When the UE 1 is located outside of the home network and the SGW 6 that the UE 1 accesses cannot directly access the PCRF (this may be called hPCRF (home PCRF) of the home network, the Gateway Control Session Establishment Procedure is performed with the hPCRF via a PCRF (this may be called vPCRF (visited PCRF)) located in a network as a movement destination.

Subsequently, the SGW 6 transmits a Proxy Binding Update (hereinafter called PBU) message to the ePDG 8 indicated with the Create Default Bearer Request message transmitted from the MME 7 at the above step S104. At this time, the PDN type, the Request type, the Bearer ID and the EPS Bearer Context Renew Indication flag also, which are stored in the Create Default Bearer Request message, will be transmitted to the ePDG (Step S106: Proxy Binding Update). The message may be one other than the PBU message as long as the message can transfer predetermined information.

Receiving the PBU message, the ePDG 8 transfers the PBU message to the PGW 5 indicated with the PBU message without performing any special processing thereto (Step S107: Proxy Binding Update ePDG). Receiving the PBU message, the PGW 5 updates the contents of the EPS bearer context that the PGW 5 itself has based on the information such as the PDN type stored in the PBU message. As a result of the updating of the EPS bearer context, the IPv4 HoA that the UE 1 holds before the handover is registered with the EPS bearer context, so that the IPv4 HoA used before the handover can be maintained. Herein when the PBU message stores the Bearer ID, the Bearer ID is registered with the EPS bearer context that the PGW 5 has similarly to the processing of the IPv4 HoA, and so the bearer used before the handover corresponding to the Bearer ID can be maintained.

After updating of the EPS bearer context, the PGW 5 checks whether the PDN connection establishment request transmitted from the UE 1 is a PDN (APN (Access Point Name) for which the UE 1 already establishes the connection or not. When connection is not established for the PDN, the PGW 5 performs IP-CAN Session Establishment Procedure with the PCRF (Step S108: IP-CAN Session Establishment Procedure). In this case, PCEF-Initiated IP-CAN Session Modification Procedure at the following step is not performed.

On the other hand, when connection is already established for the PDN (APN), the PGW 5 does not perform the IP-CAN Session Establishment Procedure at Step S108 but performs the PCEF-Initiated IP-CAN Session Modification Procedure with the PCRF (Step S109: PCEF-Initiated IP-CAN Session Modification Procedure).

Subsequently, the PGW 5 returns a Proxy Binding Ack (hereinafter called PBA) to the ePDG 8. This ACK includes parameters (PDN Type, EPS Bearer ID and the like) of a Create Default Bearer Response message (Step S110: Proxy Binding Ack ePDG). Receiving the Proxy Binding Ack at Step S110, the ePDG 8 transfers the PBA to the SGW 6 indicated with the PBA message without performing any special processing thereto (Step S111: Proxy Binding Ack). Receiving the PBA message, the SGW 6 transmits a Create Default Bearer Response message including information such as the PDN Type stored in the PBA message to the MME 7 (Step S112: Create Default Bearer Response). The following processing (each sequence shown in FIG. 2) is the same as in the conventional method, and the description thereof is omitted (refer to the above Non-Patent Document 1 and Non-Patent Document 2 for details).

Figure 3:
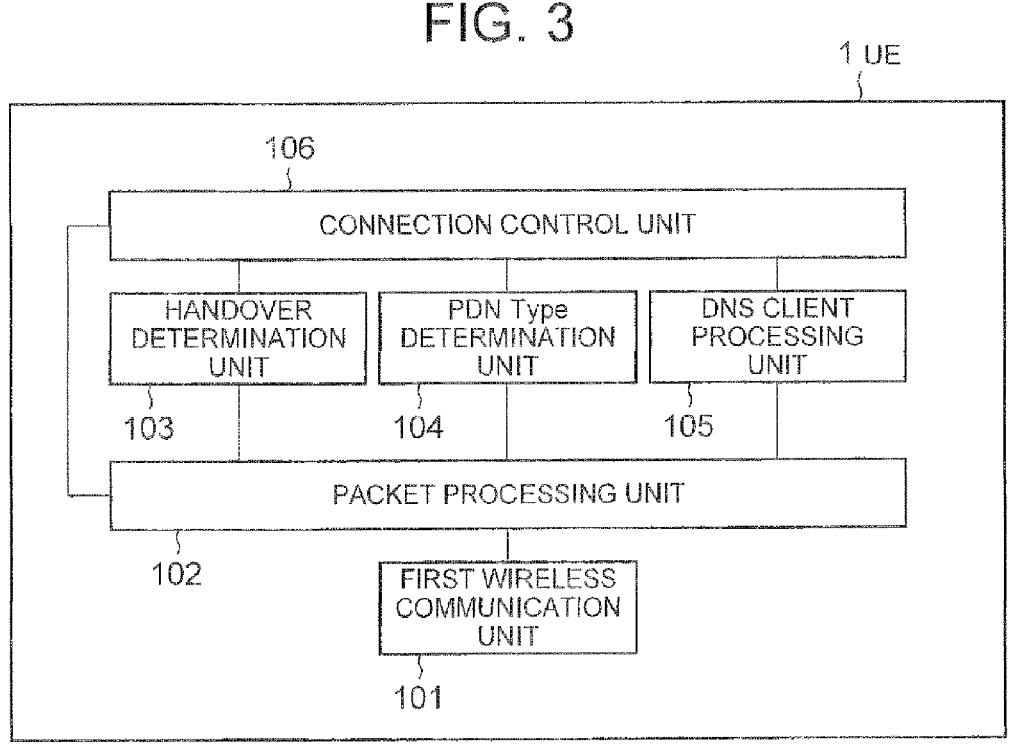
FIG. 3 shows an exemplary configuration of a mobile terminal (UE) in Embodiments 1 to 4 of the present invention.

The following describes the configuration of a mobile terminal (UE 1) to implement the present invention. Referring now to FIG. 3, the configuration of the UE 1 in Embodiments 1 to 4 of the present invention is described below. FIG. 3 shows an exemplary configuration of the UE in Embodiments 1 to 4 of the present invention.

In FIG. 3, the UE 1 includes at least a first wireless communication unit 101 connecting to each access network (3G access or N3G access) to perform communication processing at a lower layer, a packet processing unit 102 performing packet communication processing such as IP at an upper level of the first wireless communication unit 101, a DNS client processing unit 105 transmitting an inquiry message to the DNS server 9 and acquiring predetermined address information from a result received as a response, a connection control unit 106 performing processing as a feature of the present invention, a handover determination unit 103 determining whether a handover is performed or not and a PDN Type determination unit 104 determining whether a PDN Type allocated from a network during a handover and an initial attachment is identical to a requested PDN Type or not. The UE 1 may include a plurality of wireless communication units such as second and third wireless communication units in addition to the first wireless communication unit 101. Each wireless communication unit may connect to any one of the 3G access 2 and the N3G access 3, or one of the wireless communication units (e.g., the first wireless communication unit 101) may connect to the 3G access 2 and the N3G access 3 at the same time.

The following assumes that in Embodiment 1 of the present invention, as one example, the UE 1 includes one wireless communication unit (the first wireless communication unit 101), establishes a PDN connection of the IPv4v6 PDN Type with the 3G access 2 and can transmit/receive a packet using the IPv4 HoA and the IPv6 HoA.

Referring next to FIG. 10, the processing flow of the UE having the configuration shown in FIG. 3 is described below in detail, mainly describing the processing by the connection control unit 106 performing processing as a feature of the present invention. It is premised that the UE 1 already connects to the PGW 5 via the first wireless communication unit 101 and the 3G access 2, is in a state of already establishing a PDN connection of the IPv4v6 PDN Type, and is in a state capable of transmitting/receiving a packet using the IPv4 HoA and the IPv6 HoA. Further it is premised that the UE 1 in that state performs a handover to a single address type network.

FIG. 10 is a flowchart showing an exemplary processing flow by the UE 1 in Embodiment 1 of the present invention. Firstly, the UE 1 receives information on the handover generated based on the determination by the eNB from the first wireless communication unit 101. Thereafter, the handover determination unit 103 of the UE 1 detects a handover. The UE 1 may transfer information on the handover to the handover determination unit 103 via the connection control unit 106 and detect a handover (Step S1001: Inter RAT handover).

After confirming that handover processing is performed, the connection control unit 106 issues an instruction to the PDN Type determination unit 104 so as to make the PDN Type determination unit 104 check whether the PDN Type allocated from the network followed by the handover is identical to the PDN Type (IPv4v6 PDN Type) before the handover. Since the UE 1 already establishes a multi-address connection (PDN connection of the IPv4v6 PDN Type) before the handover this time, checking is performed as to whether the PDN connection is changed to the single address connection (IPv6 (IPv4) PDN Type PDN connection) or not (Step S1002).

When the PDN Type is identical to the PDN Type that the UE 1 holds before the handover, any special processing is not performed and conventional processing after the handover is performed. On the other hand, when the PDN Type is different from the PDN Type before the handover, i.e., when the UE 1 has a PDN connection of the IPv4v6 PDN Type before the handover but a single address connection type such as an IPv6 PDN Type is allocated after the handover, the connection control unit 106 instructs the DNS client processing unit 105 to search for the address of the ePDG 8 (Step S1010).

Subsequently, the UE 1 starts processing to establish a PDN connection of the IPv4v6 PDN Type with the PGW 5 via the ePDG 8 located in the core network. Firstly, the UE 1 instructs the packet processing unit 102 through the connection control unit 106 of the UE 1 to set the IPv4v6 PDN Type as the PDN Type as a parameter of the PDN Connectivity Request message to be transmitted to the MME 7 and create a message (Step S1011). Further the UE 1 instructs the packet processing unit 102 through the connection control unit 106 to set "handover" as the Request Type as a parameter of the message. Further the UE 1 instructs to set the IP address that the UE 1 wants to maintain continuously in the IP Address field. When there is a bearer that the UE 1 wants to maintain continuously, the UE 1 further instructs to set the Bearer ID corresponding to the bearer in the Bearer ID field. Further the UE 1 instructs to set indication instructing to update these parameters with the EPS bearer context that the PGW 5 has in the Renew Indication field (Steps S1012 to S1015). Thereafter, the UE 1 transmits the PDN Connectivity Request message with the respective parameters set therein to the MME 7 (Step S1016). The order of the processing from Step S1011 to Step S1015 may be changed. When there is a parameter and a field through which an IP address or the like that the UE 1 wants to maintain continuously can be reported in addition to theses parameters such as an IP address, there is no need to use the IP Address field.

The network side changes the PDN Type of the PDN connection in the EPS bearer context from the IPv6 PDN to the IPv4v6 on the basis of the operator policy and the PDN Connectivity Request message that the UE 1 transmits. Completing the updating processing of the EPS bearer context, the PGW 5 returns an updating result to the SGW 6 as a Create Default Bearer Response message. Finally, a RRC Connection Reconfiguration message is returned from the eNB to the UE 1 (Step S1017).

Receiving the RRC Connection Reconfiguration message, the UE 1 returns a RRC Connection Reconfiguration Complete message to the eNB (Step S1018). Subsequently, the UE 1 creates a PDN Connectivity Complete message at a NAS (Non-Access Stratum) layer and transmits the same to the eNB as a Direct Transfer message (Step S1019). As a result, even after a handover to a single address type network, the UE 1 can perform a communication while is maintaining the PDN connection state before the handover.

Figure 4:
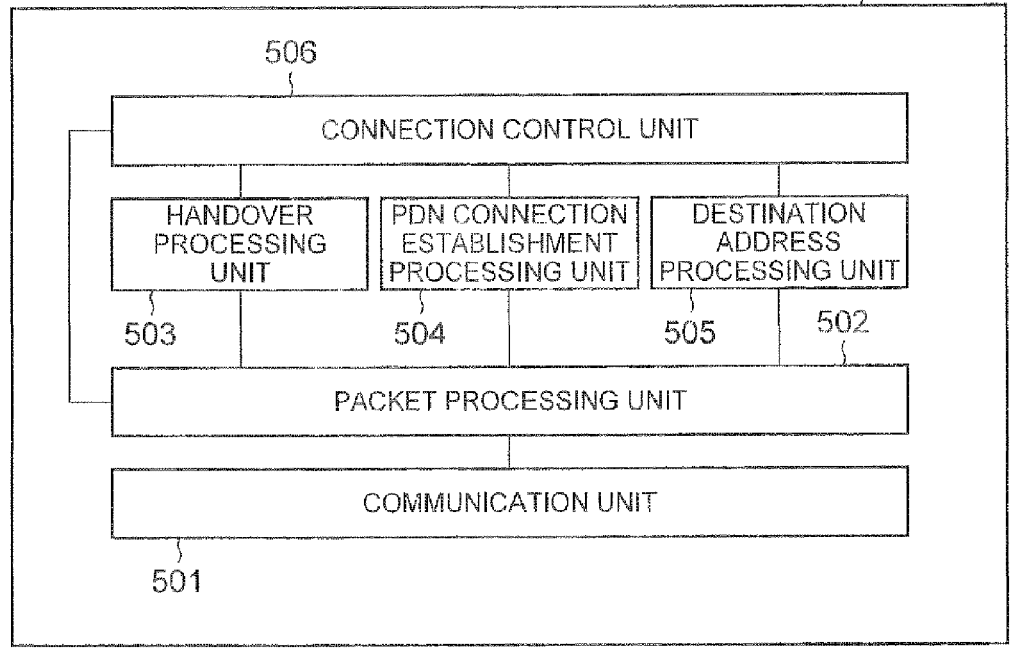
FIG. 4 shows an exemplary configuration of a PGW in Embodiments 1 to 4 of the present invention.

The following describes the configuration of a PGW to implement the present invention. Referring next to FIG. 4, the configuration of a PGW in Embodiments 1 to 4 of the present invention is described below. FIG. 4 shows an exemplary configuration of a PGW in Embodiments 1 to 4 of the present invention. In FIG. 4, the PGW 5 includes at least a communication unit 501 connecting to the core network to perform communication processing at a lower layer, a packet processing unit 502 performing packet communication processing such as IP at an upper level of the communication unit 501, a handover processing unit 503 performing processing such as temporary holding of an IP address of EPS bearer context when the UE 1 performs a handover, a PDN connection establishment processing unit 504 processing a PDN connection request when receiving the PDN connection request from the UE 1, a destination address processing unit 505 determining to which one of the PGW 5 and the ePDG 8 a PDN connection request message transmitted from the UE 1 is to be transmitted, and a connection control unit 506 performing processing as a feature of the present invention.

Figure 12:
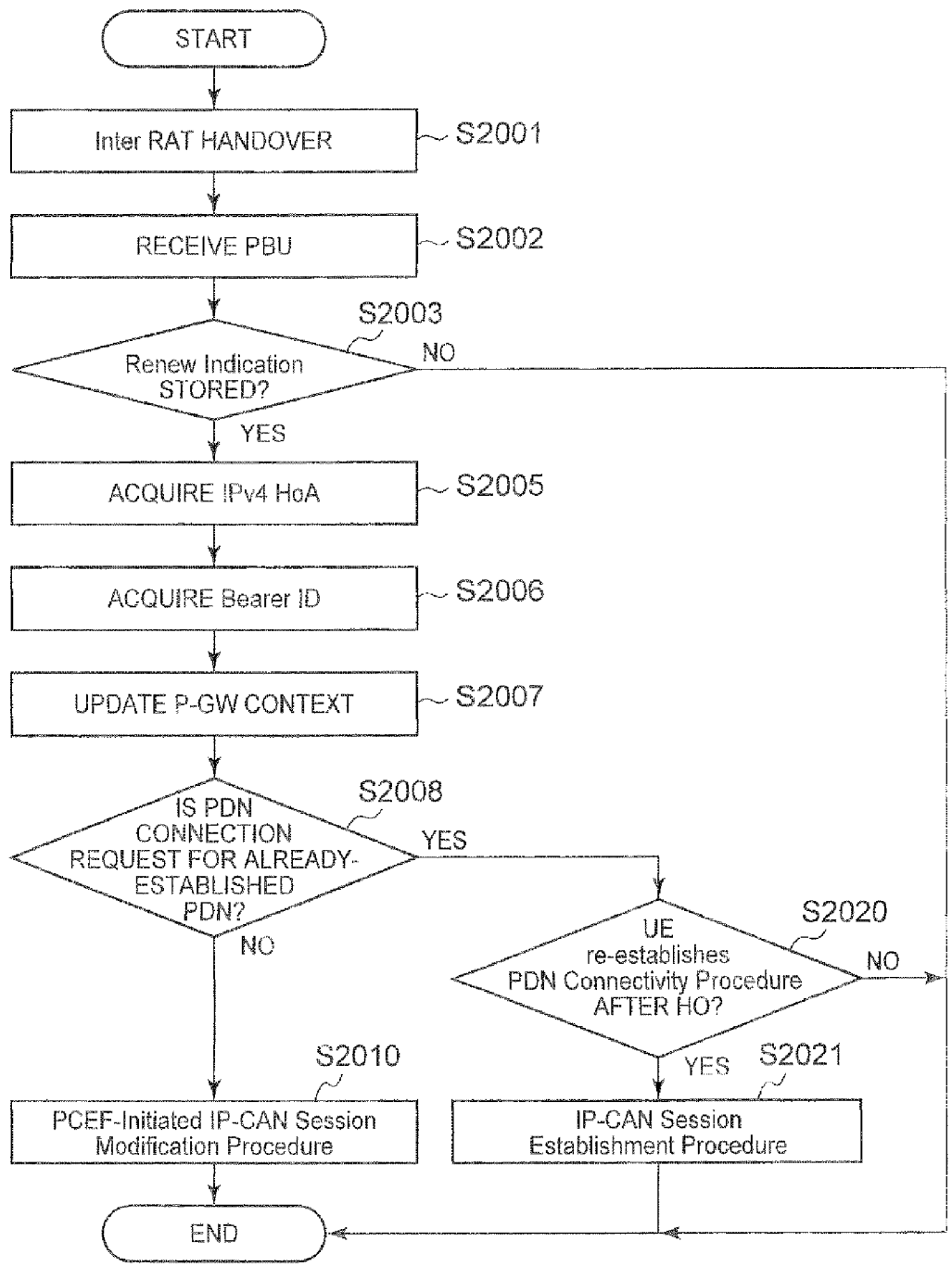
FIG. 12 is a flowchart showing an exemplary processing flow by a PGW in Embodiment 1 of the present invention.

Referring next to FIG. 12, the processing flow of the PGW 5 having the configuration shown in FIG. 4 is described below in detail, mainly describing the processing by the connection control unit 506 performing processing as a feature of the present invention. It is premised that the PGW 5 already connects to the 3G access 2 via the communication unit 501. Further it is premised that the PGW 5 is in a state of transmitting/receiving a packet with the UE 1 already establishing an IPv4v6 PDN Type PDN connection. Further it is premised that the UE 1 performs a handover to a single address type network.

FIG. 12 is a flowchart showing an exemplary processing flow by the PGW 5 in Embodiment 1 of the present invention. Firstly, the PGW 5 receives a message on a handover of the UE 1 generated based on the determination by the eNB from the communication unit 501. Thereafter, the handover processing unit 503 of the PGW 5 processes the handover of the UE 1 and updates positional information on the UE 1 (Step S2001: Inter RAT handover). Thereafter, the PGW 5 receives a PBU message including a message for maintaining a PDN connection by the UE 1 from the ePDG 8 (Step S2002). Receiving the PBU message, the PGW 5 checks whether Renew Indication indicating to update EPS bearer context of the UE 1 is stored in the PBU message or not (Step S2003).

When the PBU message does not store the Renew Indication, the PGW 5 does not perform any special processing and determines as a typical PDN connection request, and the PGW 5 performs conventional processing. On the other hand, when the PBU message stores the Renew Indication, the PGW 5 fetches the IPv4 HoA stored in the received PBU message (Step S2005). Subsequently, when the PBU message stores a Bearer ID, the PGW 5 fetches the Bearer ID from the PBU message (Step S2006). The processing order of Step S2005 and Step S2006 may be exchanged.

Thereafter, the PGW 5 adds the IPv4 HoA and the Bearer ID fetched from the PBU message to P-GW context that the PGW 5 itself has for updating (Step S2007). Subsequently, the PGW 5 checks whether the PDN connection request requested by the UE 1 is for the PDN already established by the UE 1. Herein, the checking may be performed based on an APN (Access Point Name) stored in the PDN Connectivity Request as an identifier (Step S2008). When the PDN connectivity Request is not for the PDN already established, the PGW 5 starts PCEF-Initiated IP-CAN Session Modification Procedure to the PCRF (Step S2010).

On the other hand, when the PDN connectivity Request is for the PDN already established, the PGW 5 checks whether the procedure is UE re-establishes PDN Connectivity Procedure after handover (HO) or not (Step S2020). The checking may be performed by checking whether "handover" is stored or not as the Handover Indicator stored in the PBU message. When any means other than this Handover Indicator is available to check whether the procedure is after handover or not, such means may be used.

When the procedure is not the UE re-establishes PDN Connectivity Procedure after handover, the PGW 5 ends the procedure without performing any special processing. On the other hand, when the procedure is the ue re-establishes PDN Connectivity Procedure after handover, the PGW 5 starts IP-CAN Session Establishment Procedure with the PCRF (Step S2021). As a result, the PGW 5 establishes a PDN connection of the IPv4v6 PDN Type with the UE 1.

Figure 5:
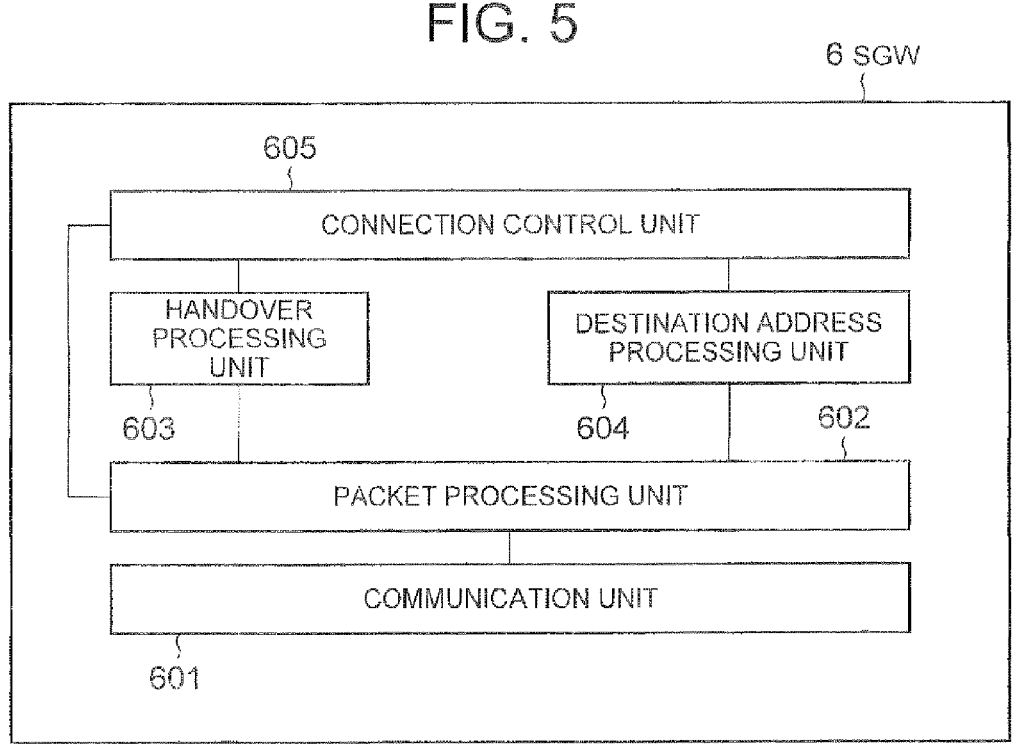
FIG. 5 shows an exemplary configuration of a SGW in Embodiments 1 to 4 of the present invention.

The following describes the configuration of a SGW 6 to implement the present invention. Referring next to FIG. 5, the configuration of a SGW 6 in Embodiments 1 to 4 of the present invention is described below. FIG. 5 shows an exemplary configuration of a SGW 6 in Embodiments 1 to 4 of the present invention. In FIG. 5, the SGW 6 includes at least a communication unit 601 performing communication processing at a lower layer with the PGW 5, the MME 7 and the like, a packet processing unit 602 performing packet communication processing such as IP at an upper level of the communication unit 601, a handover processing unit 603 performing processing of a request to avoid the PDN connection discarding generated when the UE 1 performs a handover, for example, a destination address processing unit 604 determining to which one of the PGW 5 and the ePDG 8 a PDN connection request message transmitted from the UE 1 is to be transmitted, and a connection control unit 605 performing processing as a feature of the present invention.

Figure 6:
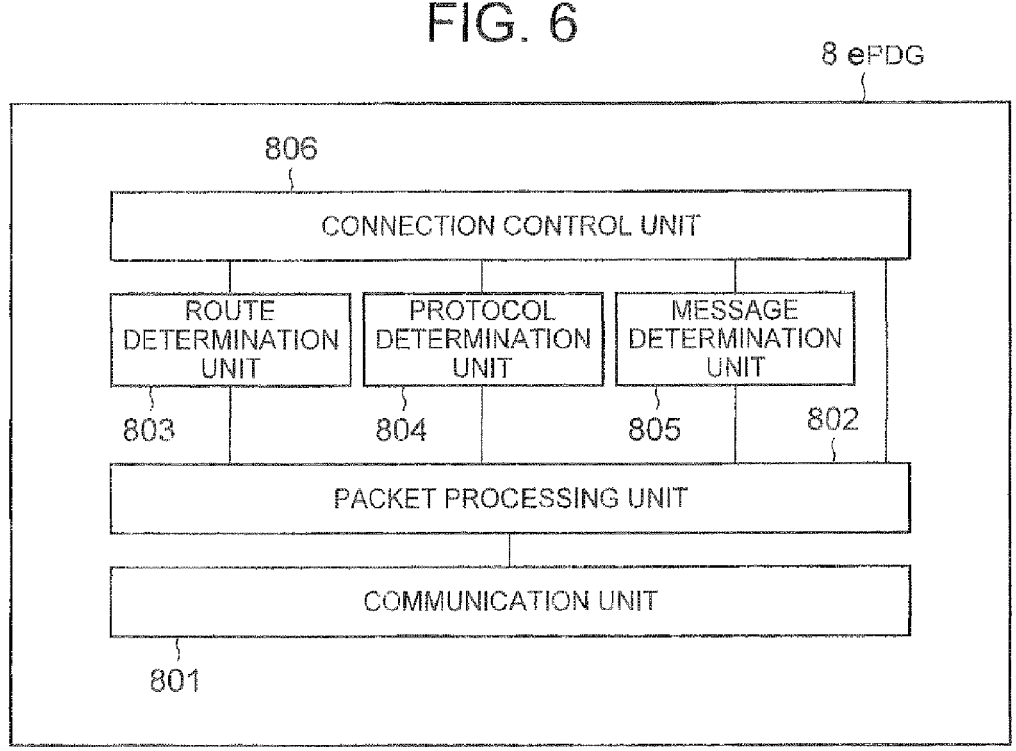
FIG. 6 shows an exemplary configuration of an ePDG in Embodiments 1 to 4 of the present invention.

The following describes the configuration of an ePDG 8 to implement the present invention. Referring next to FIG. 6, the configuration of an ePDG 8 in Embodiments 1 to 4 of the present invention is described below. FIG. 6 shows an exemplary configuration of an ePDG 8 in Embodiments 1 to 4 of the present invention.

In FIG. 6, the ePDG 8 includes at least a communication unit 801 performing communication processing at a lower layer with the PGW 5 and the like, a packet processing unit 802 performing packet communication processing such as IP at an upper level of the communication unit 801, a route determination unit 803 determining, after a PDN connection of the IPv4v6 PDN Type is established between the UE 1 and the PGW 5, whether a packet is to be transmitted directly to the UE 1 from the ePDG 8 or a packet is to be transmitted to the UE 1 via the PGW 5, a protocol determination unit 804 determining with what protocol a PBU message has been transmitted, a message determination unit 805 determining whether a received message is a PBU message or not, and a connection control unit 806 performing processing as a feature of the present invention.

Referring to FIG. 15, the processing flow of the ePDG 8 having the configuration shown in FIG. 6 is described below in detail, mainly describing the processing by the connection control unit 806 performing processing as a feature of the present invention. It is premised that the ePDG 8 already connects to the PGW 5 via the communication unit 801 and via the core network 4 and is in a state capable of transmitting/receiving a packet including a PDN connection request of the UE 1. Further it is premised that, in such a state, the UE 1 having a PDN connection of the IPv4v6 PDN Type performs a handover to a single address type network.

FIG. 15 is a flowchart showing an exemplary processing flow by the ePDG 8 in Embodiment 1 of the present invention. Firstly, when the UE 1 having the IPv4v6 PDN Type and in a state of transmitting/receiving a packet using the IPv4 HoA and the IPv6 HoA performs a handover to a single address type network, the UE 1 performs processing to maintain a communication state before the handover. Then, the communication unit 801 of the ePDG 8 receives a PBU message transmitted from the SGW 6 (Step S3001).

Receiving the PBU message, the ePDG 8 transfers the PBU message from the communication unit 801 of the ePDG 8 to the packet processing unit 802. Thereafter the PBU message is transferred from the packet processing unit 802 to the protocol determination unit 804, and the protocol determination unit 804 determines whether the transmitted PBU message is a message of a protocol that the ePDG 8 supports or not (Step S3002). At this time, instead of directly transferring the message from the packet processing unit 802 to the protocol determination unit 804, the message may be transferred via the connection control unit 806.

In general, the ePDG 8 is a device used in the N3G access 3, and includes CMIP (Client Mobile IP, which may be called MIP) and PMIP implemented therein (refer to the above Non-Patent Document 2). The UE 1 can access the ePDG 8 using PMIP at the 3G access 2 without problems. However, when the 3G access 2 uses GTP and a PBU message is transmitted to the ePDG 8 via the 3G access 2, the protocol determination unit 804 of the ePDG 8 has to support GTP.

When it is determined that the message is in accordance with the protocol that the ePDG 8 supports, the message is transferred from the protocol determination unit 804 to the message determination unit 805 via the connection control unit 806, and the message determination unit 805 determines what type of message the transmitted PBU message is (Step S3011). Note here that the SGW 6 may report PDN connection request information (e.g., PDN Type) of the UE 1 using a new message, instead of the PBU message, and therefore there is a need to determine what type of message is transmitted.

When the received message is determined as a message concerning the PDN connection request, the message is transferred from the message determination unit 805 to the packet processing unit 802 via the connection control unit 806 to create a Proxy Binding Update ePDG message (Step S3012). Parameters stored in the Proxy Binding Update ePDG message are basically the same as the parameters (e.g., PDN Type and APN) stored in the PBU message. However, when there is a parameter that the ePDG 8 especially wants to store, such a parameter can be stored. The created Proxy Binding Update ePDG message is transferred from the packet processing unit 802 to the communication unit 801, and is transmitted to the PGW 5 (Step S3013). Thereafter, the communication unit 801 of the ePDG 8 receives a Proxy Binding Ack ePDG message as a response of the Proxy Binding Update ePDG message (Step S3014). The received Proxy Binding Ack ePDG message is transferred from the communication unit 801 to the connection control unit 806 via the packet processing unit 802.

Subsequently, checking is performed as to whether the Proxy Binding Update ePDG message is correctly processed or not based on the Proxy Binding Ack ePDG message (Step S3021). When the message ends normally, the ePDG 8 instructs the packet processing unit 802 to create a PBA message, and the packet processing unit 802 creates the PBA message (Step S3022). After creating the PBA message, the PBA message is transmitted to the SGW 6 from the packet processing unit 802 via the communication unit 801 as a response of the PBU message (Step S3023). When a communication path enabling packet transmission/reception is established between the UE 1 and the ePDG 8 (e.g., Untrusted N3G access), the ePDG 8 may make an inquiry to the route determination unit 803, prior to transmission of the PBA message to the SGW 6, as to whether a packet is to be transmitted directly to the UE 1 from the ePDG 8 or a packet is to be transmitted to the UE 1 via the PGW 5, and then may determine the route for transmission of the PBA message. The selection of an optimum route for PBA message transmission can reduce processing load on devices including the PGW 5 functioning at the 3G access 2 or can shorten transmission time of a packet.

The processing based on Embodiment 1 allows the UE 1 in a state of transmitting/receiving a packet using the IPv4 HoA and the IPv6 HoA and performing a handover to a network supporting a single address connection only to maintain the IPv4 HoA and the IPv6 HoA held before the handover without depending on the operator policy. That is, the UE 1 can perform a handover to a single address type network without discarding packet transfer addressed to an address (in Embodiment 1, the IPv4 HoA), which would be discarded conventionally. Thereby, the UE 1 can receive a packet received before the handover even at a network after the handover, and so a PDN connection (IPv4v6 PDN Type) can be maintained without performing any specific processing even when the UE 1 performs a handover again to a multi-address type connection supporting network.

Embodiment 2

Figure 7:
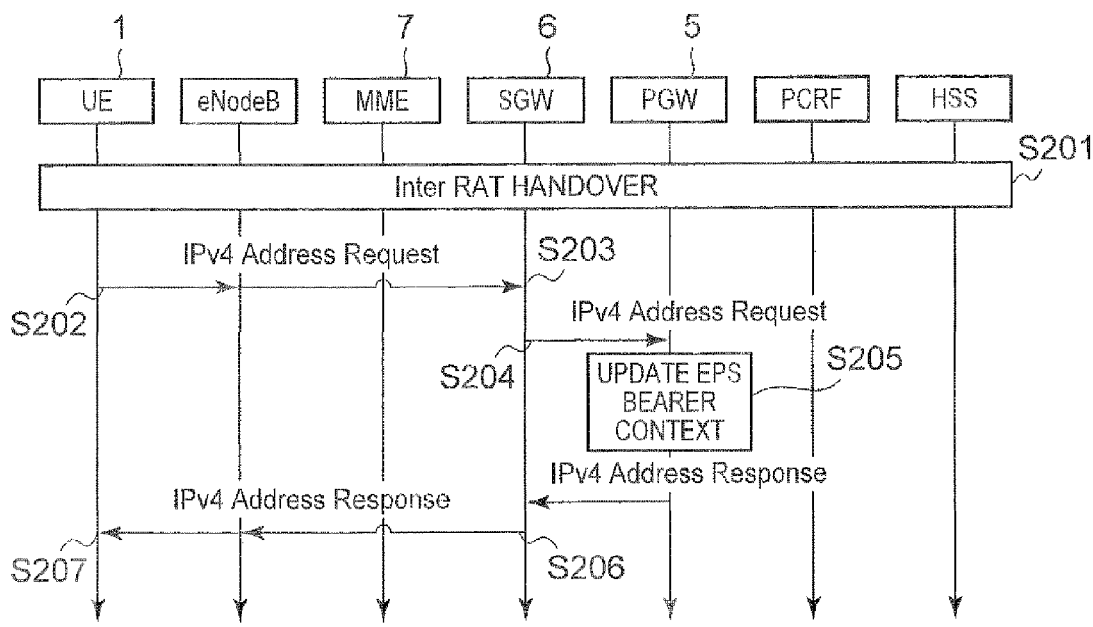
FIG. 7 is a sequence chart describing an exemplary operation of a multi-address connection establishment method in a single address type network in Embodiment 2 of the present invention.

Referring to FIG. 7, the following is a detailed description of an exemplary system operation in Embodiment 2 of the present invention. FIG. 7 is a sequence diagram to describe an exemplary system operation in Embodiment 2 of the present invention. FIG. 7 shows an exemplary processing sequence performed by at least a UE 1, an eNB directly transmitting/receiving a packet with the UE1, a MME 7 performing mobility management of the UE 1, a SGW 6 controlling the eNB, a PGW 5 controlling the SGW 6 and playing a role as a gateway to the PDN to manage positional information on the UE 1, a PCRF managing accounting control of the UE1 and the like and a HSS holding and managing subscription information of the UE 1 and the like. When other constitution elements performing the respective functions are available, such elements may be used.

FIG. 7 assumes that an IPv6 PDN Type is allocated and shows a sequence enabling reception of a packet addressed to the IPv4 HoA as well as the IPv6 HoA. When the UE 1 is about to leave a packet transfer area that the eNB covers, or when a different network is allocated to the UE 1 in accordance with the operator policy, the eNB to which the UE 1 currently connects starts handover processing to an access network as a handover destination (refer to Non-Patent Document 1 described above).

The UE 1 establishes a PDN connection of an IPv4v6 PDN Type with the PGW 5 before the handover and transmits/receives a packet using the IPv4 HoA and the IPv6 HoA. As a result of the handover to the single address type network, however, the PDN Type of the UE 1 is changed from the IPv4v6 PDN type to the IPv6 PDN Type based on the operator policy of the network as the handover destination. That is, a packet addressed to the IPv4 HoA that the UE 1 used before the handover is discarded on the network side, and a packet addressed to the IPv4 HoA will not be transferred. The UE 1 further cannot transmit a packet having the IPv4. HoA as a source address to the network side (Step S201: Inter RAT handover).

Embodiment 2 describes the case where the PDN connection type is changed from the IPv4v6 PDN Type to the IPv6 PDN Type and a packet addressed to the IPv4 HoA is discarded. Depending on the operator policy, however, the PDN connection type may be changed to the IPv4 PDN Type and a packet addressed to the IPv6 HoA may be discarded. The present invention is applicable to such a case also, and can achieve the desired objects by the method similar to the method described in the present embodiment.

Herein, this single address type network includes the following cases, one of which is a network supporting IPv4 and IPv6 based on the operator policy but is allowed to use only one of these IPv4 and IPv6, and the other of which is a network supporting only one of the IPv4 and IPv6 where the concept of IPv4v6 PDN Type is not considered. In the latter case, the UE 1 may transmit, to a network, a PDN connection request message that is for newly establishing a PDN connection corresponding to an address not allocated in addition to a single address connection allocated from the network (refer to Non-Patent Document 2 described above).

Receiving a result thereof, the UE 1 updates EPS bearer context that the SGW 6 and the PGW 5 have via the eNB to receive a packet addressed to the IPv4 HoA used before the handover, and transmits an IPv4 Address Request message instructing so that a packet addressed to the IPv4 HoA can be delivered to the UE 1 (Step S202: IPv4 Address Request).

Note here that at Step S202 of FIG. 7 the IPv4 Address Request message that the UE 1 transmits to the eNB may have the same format as used in the PDN Connectivity Request message used in Embodiment 1 (the format of the message shown in FIG. 8), and therefore the description thereof is omitted.

Receiving the IPv4 Address Request message, the eNB transfers the message to the SGW 6 without changing the message (Step S203: IPv4 Address Request). Receiving the IPv4 Address Request message transmitted from the eNB, the SGW 6 modifies the EPS bearer context that the SGW 6 itself has based on parameters (e.g., IPv4 HoA) stored in the IPv4 Address Request message. As a result of the modification, updating is made so that a packet addressed to the IPv4 HoA, which was not transferred because of the handover by the UE 1, can be transferred, and the EPS bearer context returns to the state before the handover. Concurrently the SGW 6 transfers the IPv4 Address Request message from the eNB to the PGW 5 without changing the message (Step S204: IPv4 Address Request).

Receiving the IPv4 Address Request message from the SGW 6, the PGW 5 modifies the EPS bearer context that the PGW 5 itself has based on parameters (e.g., IPv4 HoA) stored in the IPv4 Address Request message. As a result of the modification, the latest EPS bearer relating to the UE 1 is registered, and even when the UE 1 performs a handover later, a PDN connection state that is currently active can be taken over (Step S205: Update EPS bearer context). Herein, when a Bearer ID is stored in the IPv4 Address Request message, a bearer corresponding to the Bearer ID used before the handover can be used even after the handover. Thereafter, the PGW 5 returns an IPv4 Address Response message to the eNB as a response message in response to the IPv4 Address Request message (Step S206: IPv4 Address Response). Receiving the IPv4 Address Response message from the SGW 6, the eNB transfers the IPv4 Address Response message to the UE 1 (Step S207: IPv4 Address Response).

At Steps S204 and S205 where the EPS bearer context is updated, the PGW 5 may inform the UE 1 that the EPS bearer context is updated by rewriting the address of a destination header (corresponding to the IPv4 HoA) as the IPv6 HoA of the UE 1 or by adding a header to a conventional message. Alternatively, during the Inter RAT handover processing, the UE 1 may inform the network side beforehand that the IPv4 PDN Type not allocated is to be maintained, thus instructing to deliver a message addressed to the IPv4 HoA to the UE 1. The following describes a specific method with reference to FIG. 11.

Figure 11:
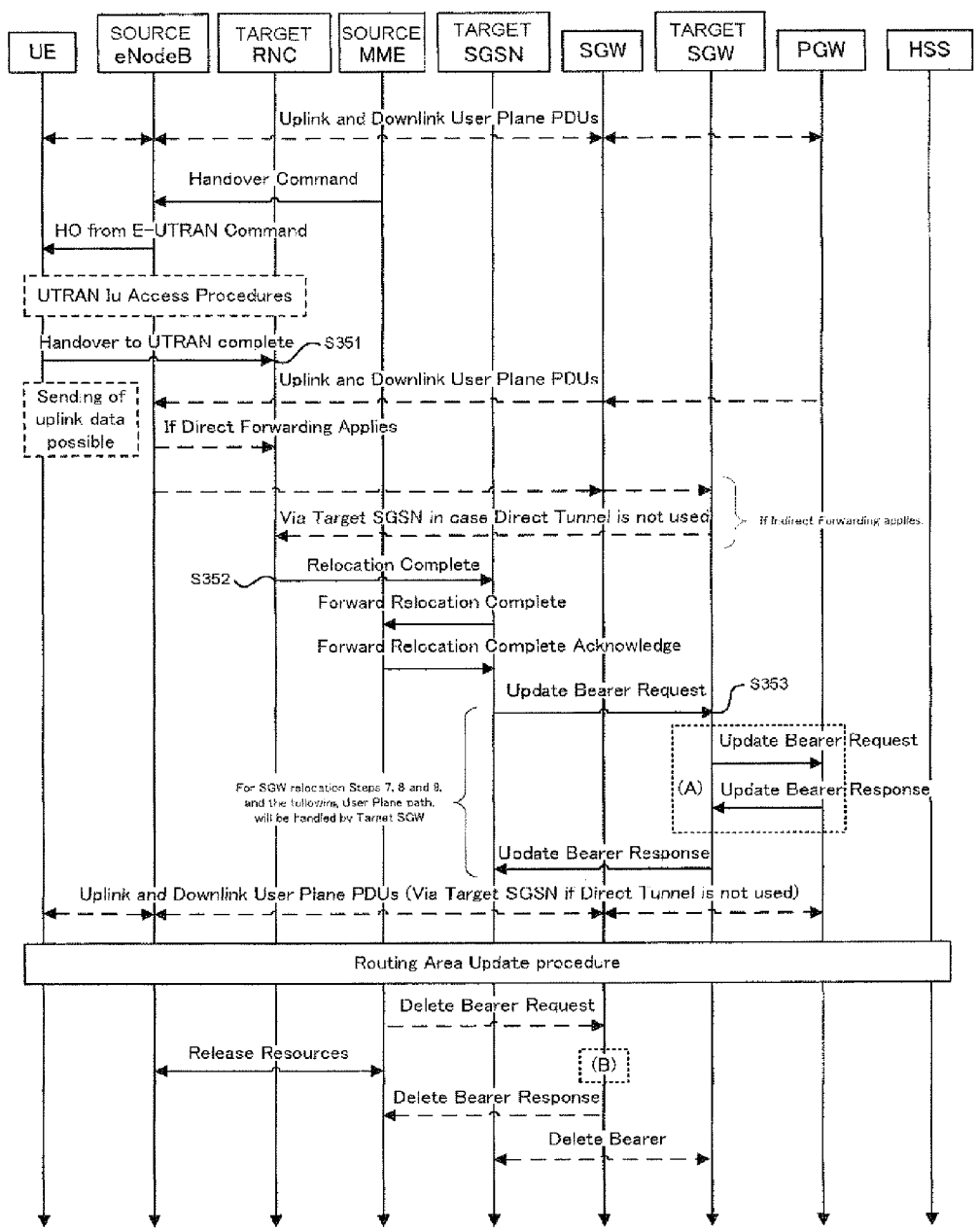
FIG. 11 is a sequence chart describing an exemplary operation in Inter RAT handover techniques relating to Embodiment 2 of the present invention.

FIG. 11 is a partial sequence diagram when a handover is performed from a multi-connection supporting network to a single address type network. When the UE 1 transmits a Handover to UTRAN complete message to a target RNC (Radio Network Controller), the UE 1 adds, to the Handover to UTRAN complete message, a flag instructing not to delete PDN connection information relating to the IPv4 HoA from the EPS bearer context that each of the target SGSN (Serving GPRS Support Node), the SGW 6 and the PGW 5 has, and when there is a bearer not to be deleted, a Bearer ID corresponding to the bearer.

Figure 9A:
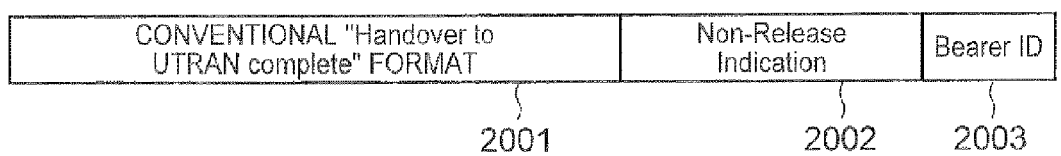
FIG. 9A shows an exemplary format of a Handover to UTRAN Complete message that a mobile terminal (UE) transmits to a target RNC in Embodiment 2 of the present invention.

FIG. 9A shows an exemplary Handover to UTRAN complete message that the UE 1 transmits to the target RNC at Step S351 of FIG. 11. The UE 1 provides a Non-Release Indication field 2002 and a Bearer ID field 2003 in addition to a conventional and standard Handover to UTRAN complete message 2001, and so can inform the target RNC of the respective predetermined values. Note here that this message may be a message other than the Handover to UTRAN complete message as long as the message can transfer predetermined information.

Receiving the Handover to UTRAN complete message, the target RNC adds the Non-Release Indication and the Bearer ID received with the Handover to UTRAN complete message to a Relocation Complete message that is transmitted to report that the information before the handover has been transferred completely to the target RNC, and transmits the same to a target SGSN.

Figure 9B:
FIG. 9B shows an exemplary format of a Relocation Complete message that a target RNC transmits to a target SGSN in Embodiment 2 of the present invention.

FIG. 9B shows an exemplary Relocation Complete message that the target RNC transmits to the target SGSN at Step S352 of FIG. 11. The target RNC provides a Non-Release Indication field 2102 and a Bearer ID field 2103 in addition to a conventional and standard Relocation Complete message 2101, and so can inform the target SGSN of the respective predetermined values. Note here that this message may be a message other than the Relocation Complete message as long as the message can transfer predetermined information.

Receiving the Relocation Complete message, the target SGSN adds parameters (Non-Relocation Indication and Bearer ID) received with the Relocation Complete message to the Update Bearer Request message indicating that the target SGSN currently can respond to every EPS bearer context established by the UE, and transmits the same to the target SGW.

Figure 9C:
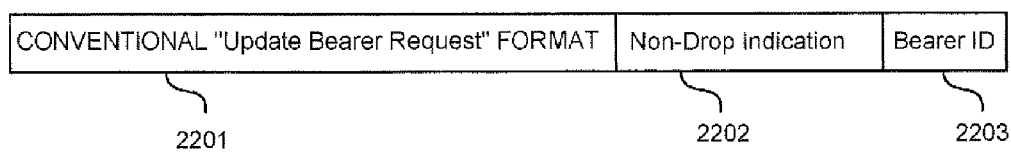
FIG. 9C shows an exemplary format of an Update Bearer Complete message that a target SGSN transmits to a target SGW in Embodiment 2 of the present invention.

FIG. 9C shows an exemplary Update Bearer Request message that the target SGSN transmits to the target SGW at Step S353 of FIG. 11. The target SGSN provides a Non-Release Indication field 2202 and a Bearer ID field 2203 in addition to a conventional and standard Update Bearer Request message 2201, and so can inform the target SGW of the respective predetermined values. Note here that this message may be a message other than the Update Bearer Request message as long as the message can transfer predetermined information.

Thereafter, typical handover processing is performed. As a result, the SGSN, the SGW 6 and the PGW 5 do not delete PDN connection information relating to the IPv4 HoA from the EPS bearer contexts, and the SGW 5 does not discard a packet addressed to the IPv4 HoA and can inform the UE of the packet.

Embodiment 3

Figure 13:
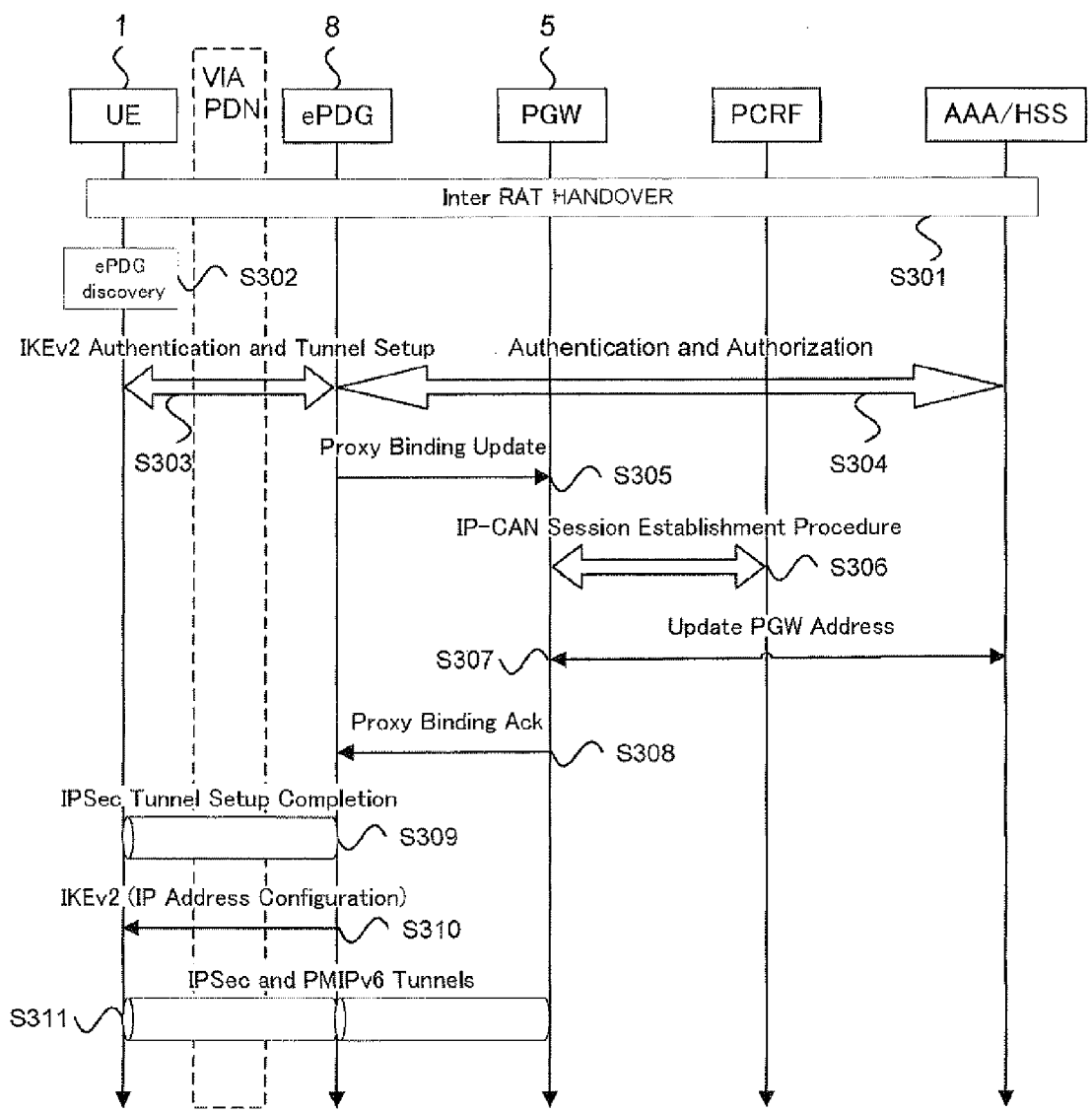
FIG. 13 is a sequence chart describing an exemplary operation of a multi-address connection establishment method in a single address type network in Embodiment 3 of the present invention.

Referring to FIG. 13, the following is a detailed description of an exemplary system operation in Embodiment 3 of the present invention. FIG. 13 is a sequence diagram to describe an exemplary system operation in Embodiment 3 of the present invention. FIG. 13 shows a state where the UE 1 has a PDN connection of an IPv4v6 PDN Type and transmits/receives a packet in the PDN connection using the IPv4 HoA and the IPv6 HoA. FIG. 13 assumes that following a handover by the UE 1 to a single address type network, an IPv6 PDN Type is allocated, and shows a sequence enabling transmission/reception of a packet addressed to the IPv4 HoA while maintaining the IPv4 HoA acquired before the handover.

FIG. 13 shows an exemplary processing sequence performed by at least a UE 1, an ePDG 8 that is a constitution element having a function to establish a PDN connection at an Untrusted N3G access 3, a PGW 5 managing positional information on the UE 1, a PCRF managing accounting control of the UE 1, an AAA (Authentication, authorization and Accounting) server as a UE authorization server determining whether the UE 1 is allowed or not to use each access network and a HSS holding and managing subscription information of the UE 1 and the like. When other constitution elements performing the respective functions are available, such elements may be used. The AAA server and the HSS may be implemented in the same device physically and logically, and hereinafter for explanatory convenience, the AAA server and the HSS may be called collectively an AAA/HSS.

When the UE 1 is about to leave a packet transfer area that the eNB covers, or when a different eNB is allocated to the UE 1 in accordance with the operator policy (e.g., detection of an eNB suitable for the UE 1), the eNB starts handover processing to allocate a new eNB to the UE 1.

The UE 1 establishes a PDN connection of an IPv4v6 PDN Type with the PGW 5 before the handover and transmits/receives a packet using the IPv4 HoA and the IPv6 HoA. As a result of the handover to the single address type network, however, the PDN Type is changed from the IPv4v6 PDN type to the IPv6 PDN Type based on the operator policy of the network as the handover destination. That is, the IPv4 HoA that the UE 1 used before the handover is discarded, and a packet addressed to the IPv4 HoA will not be transferred. The UE 1 cannot transmit a packet having the IPv4 HoA as a source address to the network side (Step S301: Inter RAT handover).

Embodiment 3 describes the case where the PDN connection type is changed from the IPv4v6 PDN Type to the IPv6 PDN Type and a packet addressed to the IPv6 HoA only is transferred. Depending on the operator policy, however, the PDN connection type may be changed to the IPv4 PDN Type and a packet addressed to the IPv4 HoA only may be transferred. The present invention is applicable to such a case also, and can achieve the desired objects by the method similar to the method described in the present embodiment.

After the handover at Step S301 (e.g., Inter RAT handover), the UE 1 detects a change of the PDN Type and performs processing for receiving a packet addressed to the IPv4 HoA used before the handover. For instance, the UE 1 makes an inquiry about the address of the ePDG 8 to the DNS server 9 (Step S302: ePDG Discovery). Although the UE 1 makes an inquiry to the DNS server 9 to acquire the address of the ePDG 8 in this example, the UE 1 may store the address of the ePDG 8 during the connection to the N3G access 3, and may reuse such address information.

The ePDG 8 is used because the addition of new functions to constitution elements existing in the current core network can be minimized. When another element equal to the ePDG 8 in the level of the modification is available, such an element may be used.

The UE 1 acquiring the address of the ePDG 8 performs IKEv2 Authentication and Tunnel Setup with the ePDG 8 via the PGW 5 on the 3G access 3 and further via the PDN (Step S303: IKEv2 Authentication and Tunnel Setup). The ePDG 8 originally is a device on the core network and is used when the UE 1 uses the N3G access 3. However when handover processing or the like is performed to the ePDG 8 via the PDN while using the 3G access 2 as in Embodiment 3, there is a need to set a parameter so as to allow the ePDG 8 to recognize a PDN connection establishment request by the UE 1. For instance, a value corresponding to a 3G IP address may be set as the ATT (Access Technology Type).

This step S303 is conventionally for protecting a message exchanged between the UE 1 and the ePDG 8 in the Untrusted N3G access 3. In Embodiment 3, however, a message is exchanged between the ePDG 8 and the UE 1 via the PDN, and so this step may be omitted depending on the security level required.

During the processing of IKEv2 Authentication and Tunnel Setup, in order to indicate that the UE 1 wants to maintain the state before the handover, the UE 1 adds, to a message transmitted to the ePDG 8, Renew Indication indicating an update request of EPS bearer context, a PDN Type before the handover (in Embodiment 3 IPv4v6 PDN Type), the IPv4 HoA discarded due to the handover, and when there is a bearer that the UE 1 wants to maintain, a Bearer ID corresponding to the bearer. The UE 1 transmits the same to the ePDG 8. When any other means to inform the ePDG 8 of the parameters is available other than the message transmitted to the ePDG 8 during the IKEv2 Authentication and Tunnel Setup processing, such a message may be used.

Figure 14A:
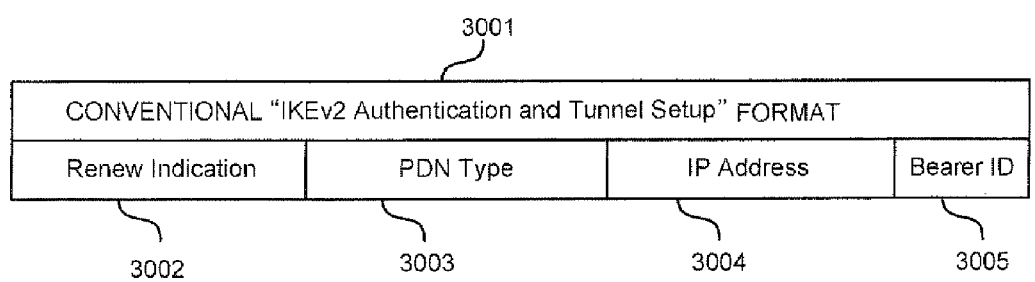
FIG. 14A shows an exemplary format of an IKEv2 Authentication and Tunnel Setup message that a UE transmits to an ePDG in Embodiments 3 and 4 of the present invention.

FIG. 14A shows an exemplary message in the IKEv2 Authentication and Tunnel Setup that the UE 1 transmits to the ePDG 8 at Step S303 of FIG. 13. The UE 1 provides a Renew Indication field 3002, a PDN Type field 3003, an IP Address field 3004 and a Bearer ID field 3005 in addition to a conventional and standard message 3001 transmitted in the IKEv2 Authentication and Tunnel Setup, and can inform the ePDG 8 of the respective predetermined values. Note here that this message may be a message other than the message in the IKEv2 Authentication and Tunnel Setup as long as the message can transfer predetermined information. For instance, instead of the Renew Indication field 3002, a Handover Indication field of a typical IKEv2 message may be used. Instead of the PDN Type field 3003 and the IP Address field 3004, a PDN Type and the IPv4 address discarded may be stored in a CFG request of a typical IKEv2 message.

Subsequently, in order to acquire information on the PGW 5 and authenticate the UE 1, the ePDG 8 performs Authentication and Authorization with the AAA/HSS (Step S304: Authentication and Authorization). Thereafter, the ePDG 8 transmits a PBU message to the PGW 5 so as to inform the PGW 5 of a handover indicator (HO Indicator) and ATT (Step S305: Proxy Binding Update). The ePDG 8 originally is a device on the core network 4 and is used when the UE 1 uses the N3G access 3. However, when handover processing or the like is performed to the ePDG 8 via the PDN while using the 3G access 2 as in Embodiment 3, there is a need to set a parameter so as to allow the PGW 5 to recognize a PDN connection establishment request by the UE 1. For instance, a value corresponding to a 3G IP address may be set as the ATT.

Figure 14B:
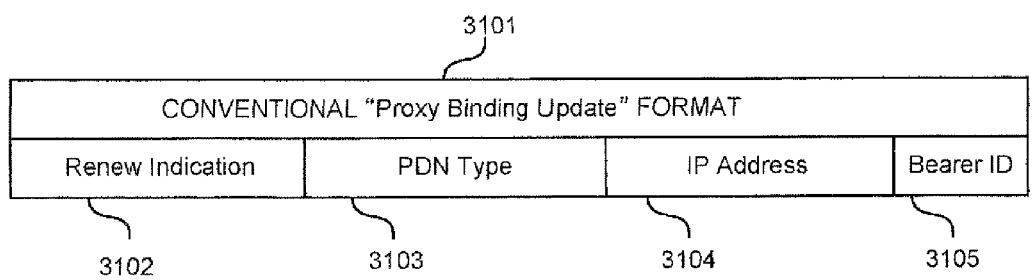
FIG. 14B shows an exemplary format of a PBU message that an ePDG transmits to a PGW in Embodiments 3 and 4 of the present invention.

FIG. 14B shows an exemplary PBU message that the ePDG 8 transmits to the PGW 5 at Step S305 of FIG. 13. The ePDG 8 provides a Renew Indication field 3102, a PDN Type field 3103, an IP Address field 3104 and a Bearer ID field 3105 in addition to a conventional and standard PBU message 3101, and can inform the PGW 5 of the respective predetermined values.

The Renew Indication field 3102 stores a value indicating updating of PDN connection information of the UE 1 in the EPS bearer context that the PGW 5 has. The PDN Type field 3103 stores a PDN Type requested by the UE 1 (in Embodiment 3 the IPv4v6 PDN Type). The IP Address field 3104 stores an address other than the IP address that was allocated before the handover by the UE 1 (In Embodiment 3 an IPv4 address). The Bearer ID field 3105 stores, when there is a bearer that the UE 1 wants to maintain, a Bearer ID corresponding to the bearer. On the basis of this information, the PGW 5 updates the EPS bearer context that the PGW 5 itself has. At this time, the PGW 5 adds the IPv6 address that has been used before the handover and is used at the time of the handover in the PDN connection together with the IPv4 address. Herein, the values newly added may be stored in an Additional Parameter field in a conventional and standard PBU message. This message may be a message other than the PBU message as long as the message can transfer predetermined information.

Subsequently, the PGW 5 performs IP-CAN Session Establishment Procedure with the PCRF (Step S306: IP-CAN Session Establishment Procedure). The PGW 5 further performs Update PGW Address message exchange so as to inform the AAA/HSS of an identifier (PGW Identity) and an APN of the PGW 5 relating to the PDN connection that the UE 1 has (Step S307: Update PGW Address). Further subsequently, the PGW 5 creates a BCE on the basis of information stored in the PBU message transmitted from the ePDG 8, and returns, to the ePDG 8, a PBA message storing an IP address to be allocated to the UE (Step S308: Proxy Binding Ack). In a typical usage method of the ePDG 8 (connection method of the ePDG 8 in the N3G access 3), the PGW 5 decides an IP address to be allocated to the UE 1 at this Step S308. However, as in the case of Embodiment 3 where handover processing is performed by accessing the ePDG 8 via the N3G access 3 and the PDN, there is no need to decide an IP address to be allocated to the UE 1 especially at this step.

Subsequently, the ePDG 8 receives the PBA message, and when the ePDG 8 determines that the PBU processing is performed successfully, the UE 1 is authenticated at this stage (Step S309: IPsec Tunnel Setup Completion). Subsequently, the ePDG 8 transmits a final IKEv2 message storing the IP address to be allocated to the UE 1 and the identifier (identity) relating to the PDN to the UE 1 (Step S310: IKEv2 (IP Address Configuration)). After Step S310 ends, IPsec tunnel is established between the UE 1 and the ePDG 8, and PMIP tunnel is established between the ePDG 8 and the PGW 5. As a result, the IPv4 HoA and the IPv6 HoA that the UE 1 holds before the handover are maintained, and a PDN connection of the IPv4v6 PDN Type is reestablished (Step S311: IPSec and PMIPv6 Tunnels).

Figure 17:
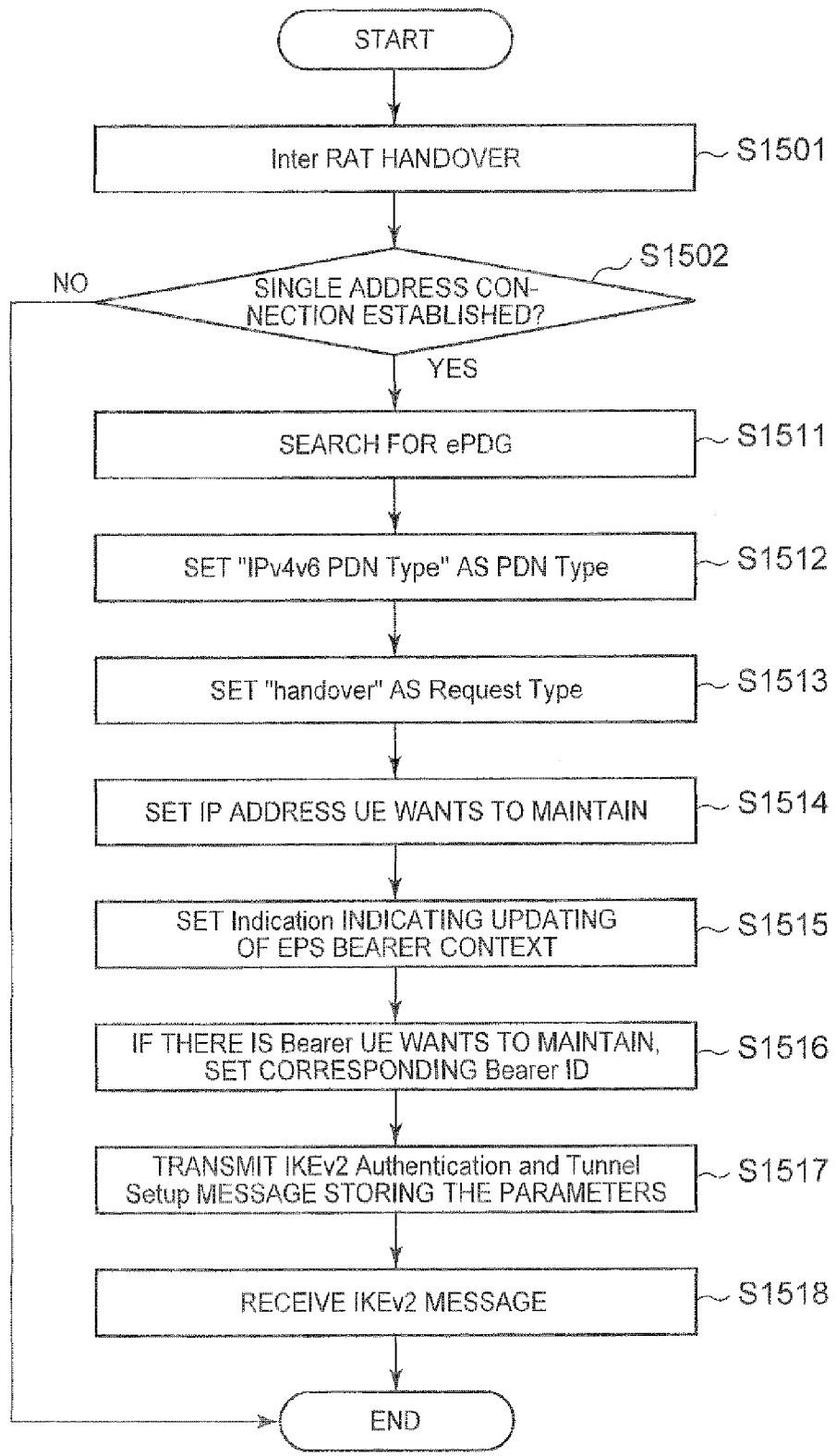
FIG. 17 is a flowchart showing an exemplary processing flow by a mobile terminal (UE) in Embodiment 3 of the present invention.

Referring next to FIG. 17, the processing flow of the UE 1 having the configuration shown in FIG. 3 is described below in detail, mainly describing the processing by the connection control unit 106 performing processing as a feature of the present invention. It is premised that the UE 1 already connects to the PGW 5 via the first wireless communication unit 101 and the 3G access 2, is in a state of already establishing a PDN connection of the IPv4v6 PDN Type, and is in a state capable of transmitting/receiving a packet using the IPv4 HoA and the IPv6 HoA. Further it is premised that the UE 1 in that state performs a handover to a single address type network.

FIG. 17 is a flowchart showing an exemplary processing flow by the UE 1 in Embodiment 3 of the present invention. Firstly, the UE 1 receives information, on the handover generated based on the determination by the eNB from the first wireless communication unit 101. Thereafter, the information is transferred to the handover determination unit 103 via the packet processing unit 102, and the handover determination unit 103 of the UE 1 detects a handover. The UE 1 may transfer information on the handover to the handover determination unit 103 via the connection control unit 101 and detect a handover (Step S1501: Inter RAT handover).

After confirming that handover processing is performed, the connection control unit 104 issues an instruction to the PDN Type determination unit 104 so as to make the PDN Type determination unit 104 check whether the PDN Type allocated from the network after the handover is identical to the PDN Type (IPv4v6 PDN Type) before the handover. Since the UE 1 already establishes a multi-address connection (PDN connection of the IPv4v6 PDN Type) before the handover this time, checking is performed as to whether the PDN connection is changed to the single address connection (IPv6 (IPv4)) PDN Type PDN connection) or not (Step S1502).

When the PDN Type is identical to the PDN Type that the UE 1 holds before the handover, any special processing is not performed and conventional processing after the handover is performed. On the other hand, when the PDN Type is different from the PDN Type before the handover, i.e., when the UE 1 has a PDN connection of the IPv4v6 PDN Type before the handover but a single address connection type such as an IPv6 PDN Type is allocated after the handover, the connection control unit 106 instructs the DNS client processing unit 105 to search for the address of the ePDG 8 (Step S1511).

The UE 1 acquiring the address of the ePDG 8 accesses the ePDG 8 via the PDN and starts processing to establish a PDN connection of the IPv4v6 PDN type with the PGW 5. Firstly, the UE 1 instructs the packet processing unit 102 through the connection control unit 106 of the UE 1 to set the IPv4v6 PDN Type as the PDN Type as a parameter of the IKEv2 Authentication and Tunnel Setup message to be transmitted to the ePDG 8 and create a message (Step S1512). Further the UE 1 instructs the packet processing unit 102 through the connection control unit 106 to set "handover" as the Request Type as a parameter of the message, the IP address that the UE 1 wants to maintain continuously in the IP Address field, when there is a bearer that the UE 1 wants to maintain continuously, the Bearer ID corresponding to the bearer in the Bearer ID field and Indication instructing to update these parameters with the EPS bearer context that the PGW 5 has in the Renew Indication field (Steps S1513 to S1516). Thereafter, the UE transmits the IKEv2 Authentication and Tunnel Setup message with the respective parameters set therein to the ePDG 8 (Step S1517). The order of the processing from Step S1512 to Step S1516 may be changed. The message may be other than the IKEv2 Authentication and Tunnel Setup message as long as the message can inform the ePDG 8 of the parameters used from the Step S1512 to Step 1515. In the above description, "handover" is set as the Request Type. Instead, the IP address that the UE wants to maintain may be set in the IP Address field. That is, a handover may be instructed by setting the IP address that the UE wants to maintain in the IP Address field.

The network side changes the PDN Type of the PDN connection in the EPS bearer context from the IPv6 PDN to the IPv4v6 on the basis of the operator policy and the IKEv2 Authentication and Tunnel Setup message that the UE 1 transmits. Completing the updating processing of the EPS bearer context, the PGW 5 returns an updating result to the ePDG 8 as a PBA message, and finally the PBA message is returned to the UE 1 as an IKEv2 message from the ePDG 8 via the PDN (Step S1517). As a result, even after the UE 1 having the IPv4 HoA and the IPv6 HoA and in a state of holding a PDN connection of the IPv4v6 PDN Type performs a handover to a single address type network, the UE 1 can perform a communication while maintaining the PDN connection state before the handover.

Referring next to FIG. 20, the processing flow of the PGW 5 having the configuration shown in FIG. 4 is described below in detail, mainly describing the processing by the connection control unit 506 performing processing as a feature of the present invention. It is premised that the PGW 5 already connects to the 3G access 2 via the communication unit 501. Further it is premised that the PGW 5 is in a state of transmitting/receiving a packet with the UE 1 already establishing an IPv4v6 PDN Type connection. Further it is premised that the UE 1 performs a handover to a single address type network.

FIG. 20 is a flowchart showing an exemplary processing flow by the PGW 5 in Embodiment 3 (and further Embodiment 4 described later) of the present invention. Firstly, the PGW 5 receives a message on a handover of the UE 1 generated based on the determination by the eNB from the communication unit 501. Thereafter, the handover processing unit 503 of the PGW 5 process the handover of the UE 1 via the packet processing unit 502 and updates positional information on the UE 1 (Step S4501: Inter RAT handover). When an instruction is issued so as not to allocate the IPv4 HoA not allocated from the UE 1 during the handover processing to other UEs 1, the PGW 5 temporarily holds the IPv4 address without allocating the same to other UEs 1.

Note here that, because the processing flow of the PGW 5 in Embodiments 3 and 4 of the present invention is shown in one drawing, the processing of Step S4502 also is shown. The processing at Step S4502 is not performed in Embodiment 3 of the present invention, but is performed in Embodiment 4 only, which is described later. Therefore, in Embodiment 3 of the present invention, following the processing at Step S4501 as stated above, not Step S4502 but Step S4503 is performed.

Thereafter, the communication unit 501 of the PGW 5 receives a PBU message including a message for maintaining a PDN connection by the UE 1 transmitted from the ePDG 8 (Step S4503). Receiving the PBU message, the PGW 5 transfers the PBU message to the PDN connection establishment processing unit 504 via the packet processing unit 502 so as to check whether Renew Indication indicating updating of EPS bearer context of the UE 1 is stored in the PBU message or not (Step S4504).

When the PBU message does not store the Renew Indication, the PGW 5 does not perform any special processing, determines as a typical PDN connection request and performs conventional processing. On the other hand, when the PBU message stores the Renew Indication, the PGW 5 instructs the packet processing unit 502 from the connection control unit 506 to perform IP-CAN Session Establishment Procedure with the PCRF, and the IP-CAN Session Establishment Procedure is performed (Step S4511). Subsequently, the PGW 5 fetches the PDN Type and the IPv4 HoA stored in the PBU message received at the above Step 4503, and when a Bearer ID is stored, the Bearer ID from a predetermined field (Step S4512 to Step S4514). The processing order from Step S4512 to Step S4514 may be changed.

Thereafter, the PGW 5 adds the PDN Type, the IPv4 HoA and the Bearer ID fetched from the PBU message to P-GW context that the PGW 5 itself has for updating (Step S4515). Subsequently, the PGW 5 transmits a PGW identifier (PGW Identity) and an APN relating to the PDN connection of the UE 1 to the AAA/HSS server. This transmitted information is registered with the HSS (Step S4516). Subsequently, the PGW 5 stores a processing result of the PBU message transmitted from the ePDG 8 in a PBA message, and transmits the same to the ePDG 8 (Step S4517). Note here that the updating processing of the P-GW context performed at the above Step S4515 may be performed after the above Step S4516 ends. As a result, the PGW 5 establishes a PDN connection of the IPv4v6 PDN Type with the UE 1.

Figure 16:
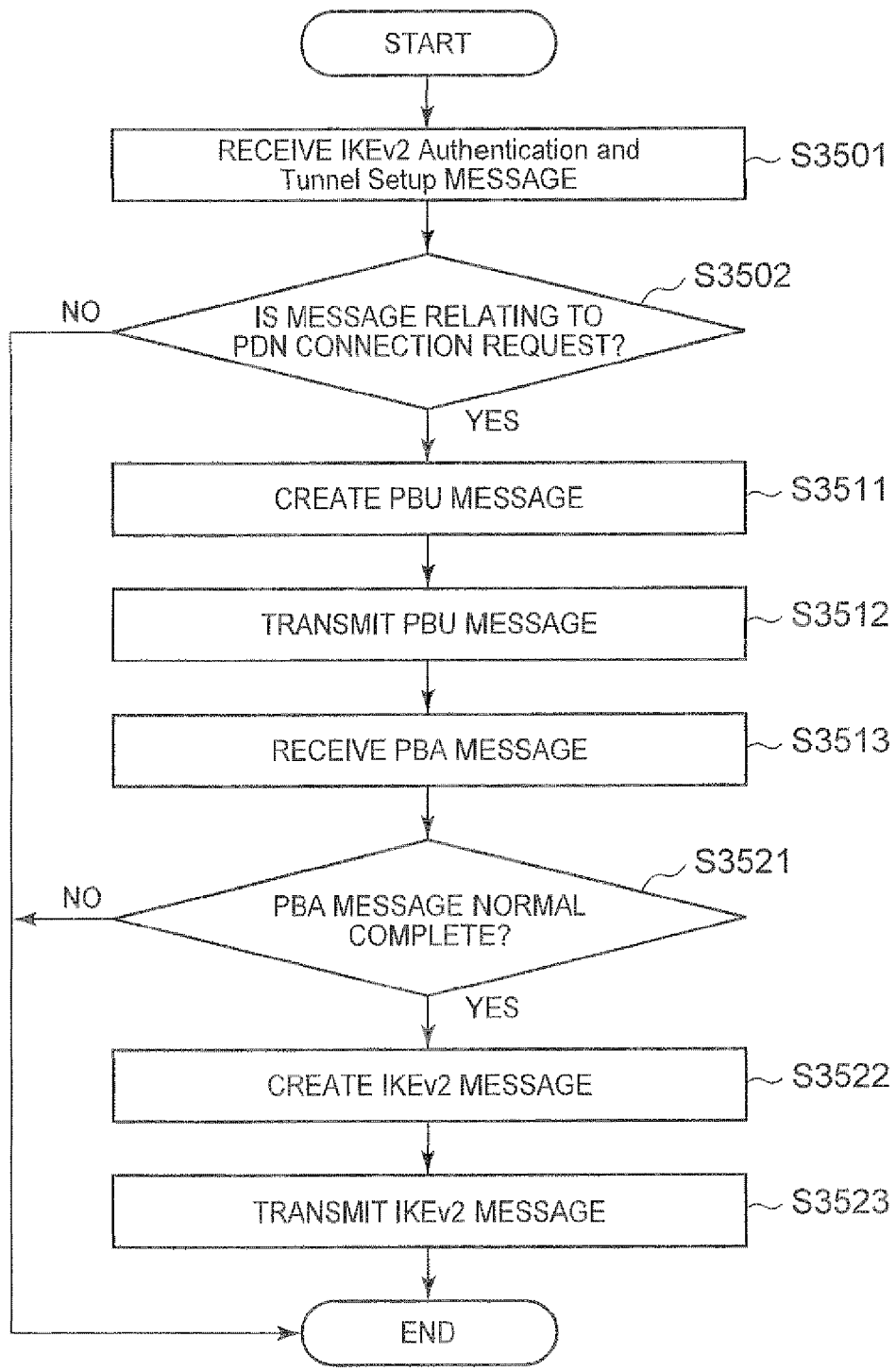
FIG. 16 is a flowchart showing an exemplary processing flow by an ePDG in Embodiments 3 and 4 of the present invention.

Referring to FIG. 16, the processing flow of the ePDG 8 having the configuration shown in FIG. 6 is described below in detail, mainly describing the processing by the connection control unit 806 performing processing as a feature of the present invention. It is premised that the ePDG 8 already connects to the PGW 5 via the communication unit and via the core network 4 and is in a state capable of transmitting/receiving a packet including a PDN connection request of the UE 1. Further it is premised that, in such a state, the UE 1 having a PDN connection of the IPv4v6 PDN Type performs a handover to a single address type network.

FIG. 16 is a flowchart showing an exemplary processing flow by the ePDG 8 in Embodiment 3 of the present invention. Firstly, when the UE 1 having the IPv4v6 PDN Type and in a state of transmitting/receiving a packet using the IPv4 HoA and the IPv6 HoA performs a handover to a single address type network, the UE 1 performs processing to maintain a communication state before the handover, whereby the communication unit 801 of the ePDG 8 receives an IKEv2 Authentication and Tunnel Setup message transmitted via the PDN (Step S3501).

The message received with the communication unit 801 is transferred from the communication unit 801 to the message determination unit 805 via the packet processing unit 802, and the message determination unit 805 determines what type of message the transmitted PBU message is (Step S3502). Note here that the UE 1 may report PDN connection request information (e.g., PDN Type) of the UE 1 using a new message, instead of the IKEv2 Authentication and Tunnel Setup message, and therefore there is a need to determine what type of message is transmitted.

When the received message is determined as a message concerning the PDN connection request, the message is transferred from the message determination unit 805 to the packet processing unit 802 via the connection control unit 806 to create a PBU message (Step S3511). Parameters stored in the PBU message are basically the same as the parameters (e.g., PDN Type and APN) stored in the IKEv2 Authentication and Tunnel Setup message at Step S3511. However, when there is a parameter that the ePDG 8 especially wants to store, such a parameter can be stored.

The created PBU message is transferred from the packet processing unit 802 to the communication unit 801, and is transmitted to the PGW 5 (Step S3512). Thereafter, the ePDG 8 makes the communication unit 801 receive a PBA message as a response of the PBU message (Step S3513). The received PBA message is transferred from the communication unit 801 to the connection control unit 806 via the packet processing unit 802. Subsequently, checking is performed as to whether the PBU message is correctly processed or not based on the PBA message (Step S3521). When the message ends normally, the ePDG 8 instructs, from the connection control unit 806, the packet processing unit 802 to create an IKEv2 message, and the packet processing unit 802 creates the IKEv2 message (Step S3522). After creating the IKEv2 message, the IKEv2 message is transmitted via the PDN to the UE 1 from the packet processing unit 802 via the communication unit 801 as a response of the IKEv2 message (Step S3523).

When a communication path enabling packet transmission/reception is established between the UE 1 and the ePDG 8 (e.g., Untrusted N3G access 3), the ePDG 8 may make an inquiry to the route determination unit 803, prior to transmission of the IKEv2 message to the UE 1 via the PDN, as to whether a packet is to be transmitted directly to the UE 1 from the ePDG 8 or a packet is to be transmitted to the UE 1 via the PDN, and then may determine the route for transmission of the IKEv2 message. The selection of an optimum route for IKEv2 message transmission can reduce processing load on devices including the PGW 5 functioning at the 3G access 2 or can shorten transmission time of a packet.

The processing based on Embodiment 3 allows the UE 1 having the IPv4 HoA and the IPv6 HoA, being in a state of holding a PDN connection of the IPv4v6 PDN Type and performing a handover to a single address type network to maintain the IP addresses (corresponding to the IPv4 HoA and the IPv6 HoA) held before the handover without depending on the operator policy. That is, in Embodiment 3, the UE 1 can perform a handover to a single address type network without discarding the IPv4 HoA and without discarding a packet addressed to the IPv4 HoA. Thereby, the UE 1 can receive a packet received before the handover even on a network after the handover, and so an IPv4v6 PDN connection can be maintained without performing any specific processing even when the UE 1 performs a handover again to a multi-address type connection supporting network, and further the UE 1 can maintain the IPv4 HoA and the IPv6 HoA.

Embodiment 4

Figure 18:
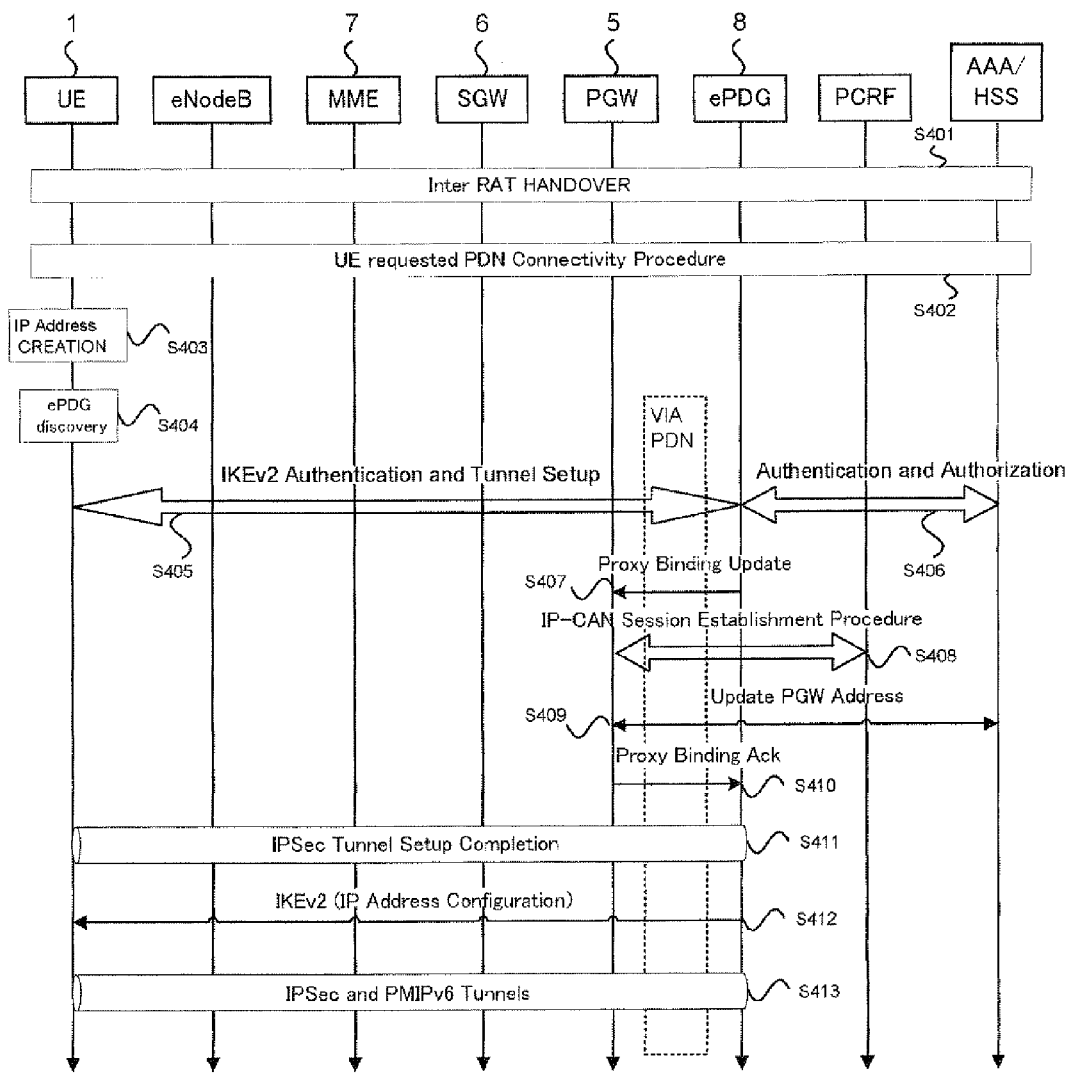
FIG. 18 is a sequence chart describing an exemplary operation of a multi-address connection establishment method in a network supporting a single address type connection only in Embodiment 4 of the present invention.

Referring to FIG. 18, the following is a detailed description of an exemplary system operation in Embodiment 4 of the present invention. FIG. 18 is a sequence diagram to describe an exemplary system operation in Embodiment 4 of the present invention. FIG. 18 assumes that a UE 1 has a PDN connection of an IPv4v6 PDN Type, is in a sate of transmitting/receiving a packet in the PDN connection using the IPv4 HoA and the IPv6 HoA, and following a handover by the UE 1 to a single address type network, an IPv6 PDN Type is allocated. FIG. 18 shows a sequence maintaining the IPv4 HoA acquired before the handover, whereby continuously enabling transmission/reception of a packet addressed to the IPv4 HoA.

FIG. 18 shows an exemplary sequence of an operation of a system including a UE 1, an eNodeB (eNB) directly transmitting/receiving a packet with the UE 1, a MME 7 performing mobility management of the UE 1, a SGW 6 performing user data path control with the eNB, a PGW (this may be called a mobility management gateway also) 5 controlling user data path control with the SGW 6 and playing a role as a gateway to the PDN to manage positional information on the UE, an ePDG (evolved Packet Data Gateway: this may be called a packet data gateway also) 8 as a constitution element to establish a PDN connection at an Untrusted N3G access 3, a PCRF (Policy Charging Rules Function) managing accounting control of the UE1 and the like, an AAA (Authentication, authorization and Accounting) server as an authorization server determining whether the UE 1 is allowed or not to use each access network and a HSS (Home Subscriber Server) holding and managing subscription information of the UE 1 and the like. When other constitution elements performing the respective functions are available, such elements may be used. The AAA server and the HSS may be implemented in the same device physically and logically, and hereinafter for explanatory convenience, the AAA server and the HSS may be called collectively an AAA/HSS.

When the UE 1 is about to leave a packet transfer area that the eNB covers, or when an eNB allocates a different eNB to the UE 1 in accordance with the operator policy (e.g., detection of an eNB suitable for the UE 1), the eNB starts handover processing to allocate a new eNB to the UE 1.

The UE 1 establishes a PDN connection of an IPv4v6 PDN Type with the PGW 5 before the handover and transmits/receives a packet using the IPv4 HoA and the IPv6 HoA. As a result of the handover to a single address type network, however, the PDN Type is changed from the IPv4v6 PDN type to the IPv6 PDN Type based on the operator policy of the network as the handover destination. That is, the IPv4 HoA that the UE 1 used before the handover is discarded, and a packet addressed to the IPv4 HoA will not be transferred. The UE 1 cannot transmit a packet having the IPv4 HoA as a source address to the network side (Step S401: inter RAT handover). During the Inter RAT handover processing, the UE 1 may instruct the PGW 5 not to discard the IPv4 HoA used before the handover for a certain time period. This instruction by the UE 1 securely prevents the IPv4 HoA from being allocated to another terminal or the like during the time period when the address is not allocated to the UE 1.

Embodiment 4 describes the case where the PDN connection type is changed from the IPv4v6 PDN Type to the IPv6 PDN Type and a packet addressed to the IPv6 HoA only is transferred. Depending on the operator policy, however, the PDN connection type may be changed to the IPv4 PDN Type and a packet addressed to the IPv4 HoA only may be transferred. The present invention is applicable to such a case also, and can achieve the desired objects by the method similar to the method described in the present embodiment.

After the handover at Step S401 (e.g., Inter RAT handover), the UE 1 detects a change of the PDN Type and establishes a temporary PDN connection (hereinafter called a temporary PDN connection) to implement processing for maintaining transmission/reception of a packet using the IPv4 HoA used before the handover. This temporary PDN connection is established for mapping the communication state of the UE 1 before the handover. That is, the temporary PDN connection is established to maintain the communication state before the handover.

Herein, the UE 1 may detect the change of the PDN type by receiving a notification on the PDN Type change during the handover processing, or may detect the PDN Type change (i.e., the allocation of the IPv4 HoA is not allowed) at the timing as an impetus when EPS bearer used for the communication using the IPv4 HoA is not established because of the handover. Alternatively, the UE 1 may detect the PDN Type change (i.e., the allocation of the IPv4 HoA is not allowed) when transmission of a packet using the IPv4 HoA immediately after the handover fails or at the timing as an impetus when a packet addressed to the IPv4 HoA is received for a certain time period.

The UE 1 establishes, aside from an IPv6 PDN connection established by the handover, a temporary PDN connection of the IPv6 PDN Type (Step S402: UE requested PDN Connectivity Procedure). Then, the UE 1 creates an IPv6 address from an IPv6 prefix acquired during the establishment of the temporary PDN connection (Step S403: IP address creation). After performing the UE requested PDN Connectivity Procedure at Step S402, the UE 1 searches for the ePDG 8 so as to perform processing for receiving a packet addressed to the IPv4 HoA used before the handover. For instance, the UE 1 makes an inquiry of the address of the ePDG 8 to the DNS server 9 (Step 404: ePDG Discovery). Although the UE 1 makes an inquiry to the DNS server 9 to acquire the ePDG address in this example, the UE 1 may store the address of the ePDG 8 during the connection to the N3G access 3, and may reuse such address information. Alternatively, the UE 1 may hold information on the ePDG 8 beforehand and may reuse the information (e.g., registering the information in a SIM card or a ROM beforehand).

The ePDG 8 is used because the ePDG 8 has a function to establish a PDN connection of the IPv4v6 PDN Type and therefore the addition of new functions to constitution elements existing on the current core network can be eliminated or minimized. When another element equal to the ePDG 8 in the level of the modification is available or when another element already having a similar function is available, such an element may be used instead of the ePDG 8.

The UE 1 acquiring the address of the ePDG 8 performs IKEv2 Authentication and Tunnel Setup with the ePDG 8 via the PGW 5 on the 3G access 2 and further via the PDN (Step S405: IKEv2 Authentication and Tunnel Setup). This step S405 may be omitted depending on the security level required. This is because Step S405 is originally for protecting a message exchanged between the UE 1 and the ePDG 8 in the N3G access 3, and in Embodiment 4 a certain level of security can be secured because a message is exchanged between the UE and the ePDG 8 via the PDN. Alternatively, null encryption may be used as an encryption/authentication protocol negotiated by this Step S405. This also is based on the same reason, and since the UE 1 accesses the ePDG 8 from the 3G access 2 with already-secured security, additional security devices can be omitted, whereby load on the network devices such as the UE 1 and the ePDG 8 can be reduced.

During the IKEv2 Authentication and Tunnel Setup, the UE 1 adds, to a message to be transmitted to the ePDG 8, Renew Indication indicating an updating request of EPS bearer context, PDN Type before the handover (i.e., IPv4v6 PDN Type), the IPv4 HoA that is not taken over to the PDN connection after the handover and an IPv6 prefix taken over so as to indicate a request by the UE 1 to maintain the state before the handover. When the UE 1 wants to maintain the state in the units of bearer, the UE 1 further adds a Bearer ID corresponding to the bearer and transmits the same to the ePDG 8.

When any other means to inform the ePDG 8 of the parameters is available other than the message transmitted to the ePDG 8 during the IKEv2 Authentication and Tunnel Setup processing, such a message may be used. In one example, since a CFG request of an IKEv2 protocol can request an IPv4 or an IPv6 address, an IP address type is designated in the CFG request message so as to inform the ePDG 8 of a PDN Type. In another example, when a message stores a PDN Type, an instruction of an updating request of EPS bearer context allows the ePDG 8 to be informed of the PDN type. In that case, there is no need to store Renew Indication. Among the above-stated parameters, Renew Indication and Bearer ID, which are not transmitted to the ePDG 8 conventionally, may be reported directly to the PGW 5 using a PCO for information exchange between the UE 1 and the PGW 5.

The message in the IKEv2 Authentication and Tunnel Setup that the UE 1 transmits to the ePDG 8 at Step S405 of FIG. 18 may have the same format as of the message shown in FIG. 14A stated above. That is, the UE 1 provides a Renew Indication field 3002, a PDN Type field 3003, an IP Address field 3004 and a Bearer ID field 3005 in addition to a conventional and standard message 3001 transmitted in the IKEv2 Authentication and Tunnel Setup, and can inform the ePDG 8 of the respective predetermined values. Note here that this message may use fields other than the fields as stated above as long as they can transfer predetermined information. For instance, instead of the Renew Indication field, a Handover Indication field as a typical IKEv2 message may be used. Instead of the PDN Type field and the IP Address field, a PDN Type, IPv4 HoA and an IPv6 Prefix may be stored in a CFG request of a typical IKEv2 message.

Subsequently, in order to acquire information on the PGW 5 and authenticate the UE 1, the ePDG 8 performs Authentication and Authorization with the AAA/HSS (Step S406: Authentication and Authorization). Thereafter, the ePDG 8 transmits a PBU message to the PGW 5 so as to inform the PGW 5 of a handover indicator (HO Indicator) and ATT (Step S407: Proxy Binding Update). The ePDG 8 originally is a device on the core network 4 and is used when the UE 1 uses the N3G access 3. However, when handover processing or the like is performed to the ePDG 8 via the PDN while using the 3G access 2 as in Embodiment 4, there is a need to set a value corresponding to a 3G IP address at ATT, for example.

The PBU message that the ePDG 8 transmits to the PGW 5 at Step S407 of FIG. 18 may have the same format as of the message shown in FIG. 14B stated above. That is, the ePDG 8 provides a Renew Indication field 3102, a PDN Type field 3103, an IP Address field 3014 and a Bearer ID field 3105 in addition to a conventional and standard message 3101, and can inform the PGW 5 of the respective predetermined values.

The Renew Indication field 3102 stores a value indicating updating of PDN connection information of the UE 1 in the EPS bearer context that the PGW 5 has. The PDN Type field 3103 stores a PDN Type (i.e., IPv4v6 PDN Type) requested by the UE 1. The IP Address field 3104 stores the IP address allocated before the handover by the UE 1 (i.e., IPv4 HoA, IPv6 prefix). The Bearer ID field 3105 stores, when as a result of determination by the UE 1 as to whether the state is to be maintained for each bearer or not, there is a bearer that the UE 1 wants to maintain, a Bearer ID corresponding to the bearer. On the basis of this information, the PGW 5 updates the EPS bearer context that the PGW 5 itself has.

Herein, the values newly added may be stored in an Additional Parameter field in a conventional and standard PBU message. For instance, instead of the Renew Indication field 3102, Additional Parameter field of the PBU message may be used. The same goes for the PDN Type field, the IP Address field and the Bearer ID field. This message may be a message other than the PBU message as long as the message can transfer predetermined information.

Subsequently, the PGW 5 performs IP-CAN Session Establishment Procedure with the PCRF (Step S408: IP-CAN Session Establishment Procedure). Subsequently, the PGW 5 performs Update PGW Address message exchange so as to inform the AAA/HSS of an identifier (PGW Identity) and an APN of the PGW 5 relating to the PDN connection that the UE 1 has (Step S409: Update PGW Address). Subsequently, the PGW 5 creates a BCE on the basis of information stored in the PBU message transmitted from the ePDG 8, and returns, to the ePDG 8, a PBA message storing an IP address (corresponding to the IPv4 HoA, the IPv6 home prefix and the like) to be allocated to the UE 1 (Step S410: Proxy Binding Ack). Subsequently, when the ePDG 8, receiving the PBA message, determines that binding processing at the PGW 5 is performed successfully, the ePDG 8 completely tunnel setup with the UE 1 (Step S411: IPSec Tunnel Setup Completion). Subsequently, the ePDG 8 transmits a completion message of IKEv2 storing the IP address to be allocated to the UE 1 and the identifier (identity) relating to the PDN to the UE 1 via the PDN (Step S412: IKEv2 (IP Address Configuration)).

After Step S412 ends, IPsec tunnel is established between the UE 1 and the ePDG 8, and PMIP tunnel is established between the ePDG 8 and the PGW 5 (GTP tunnel, when GTP protocol is applied). Thereby, the UE 1 establishes a PDN connection of the IPv4v6 PDN Type via the ePDG 8 and can maintain the IPv4 HoA allocated before the handover and the IPv6 HoA (home prefix), and so can maintain a session (Step S413: IPSec and PMIPv6 Tunnels).

In this way, the temporary PDN connection is established without using a PDN connection (PDN connection of the IPv6 PDN Type, hereinafter called a post-PDN connection 1 also) established beforehand by the handover. Such a temporary connection is established so as to securely establish the post-PDN connection of the IPv4v6 PDN Type (a first object). For instance, when attempt is made to establish a post-PUN connection on the same post-PUN connection via the ePDG 8, the PGW 5 starts processing to perform a handover from the post-PDN connection (hereinafter called a base connection) directly established with the PGW 5 by the original handover to a PDN connection being established via the ePDG 8. As a result, the base connection is released, and a resource only remains in a state where the post-PDN connection via the ePDG 8 cannot be released practically nor used, thus causing an extremely inefficient result.

As another object, a post-PDN connection is established via the ePDG 8 on a temporary PDN connection, whereby overlapping of an inside-address and an outside-address of an IP tunnel (IPsec tunnel) generated can be avoided (a second object). For instance, when attempt is made to establish a post-PDN connection on the same post-PDN connection via the ePDG 8, the same IPv6 address will be applied to the inside-address and the outside-address of the IP tunnel, thus causing confusion when a packet is transmitted/received at the UE 1 and the PGW 5.

Herein, when the problem described for the first object can be coped with, for example, when a post-PDN connection can be established via the ePDG 8, and when releasing of the base connection can be suppressed (for example, EPS bearer release by the PGW 5 and the UE 1 is stopped, and a BC managed by the PGW 5 is made to register two BCEs relating to the SGW 6 and the ePDG 8 for the PDN connection), then a different IPv6 address (and further an element enabling determination as to whether a session already ends, such as the element not used in the communication so far or the case where sufficient time has passed since the last usage) is created from the IPv6 prefix allocated to the UE 1, and such an address is used as a local address to establish an IP tunnel with the ePDG 8 on the base connection. Thereby, overlapping of the inside/outside addresses of the IP channel can be avoided, and the desired object can be achieved with one PDN connection (post-PDN connection) only, and so resource consumed (bearer resource, address resource and the like) can be reduced. At this time, as for the routing of a packet at the UE 1 and the PGW 5, a point to be considered is to set a routing table so that a packet using an IPv6 address applied to the base connection is transmitted via the base connection (e.g., a host entry is set at the PGW 5, and source routing setting is performed at the UE 1). The other IPv6 prefix may be set so as to be transmitted through the post-PDN connection via the ePDG 8 (or default setting is set for the post-PDN connection, whereby the setting for the IPv6 prefix can be omitted). Further at the PGW 5, accounting for the IPv6 prefix may be differentiated between the base connection and other connections. That is, the IPv6 address applied to the base connection may be differentiated from a packet count for the purpose of accounting in other connections.

Referring next to FIG. 19, the processing flow of the UE 1 having the configuration shown in FIG. 3 is described below in detail, mainly describing the processing by the connection control unit 106 performing processing as a feature of the present invention. It is premised that the UE 1 already connects to the PGW 5 via the first wireless communication unit 101 and the 3G access 2. It is premised that the UE 1 is in a state of already establishing a PDN connection of the IPv4v6 PDN Type, i.e., a multi-address type connection and is in a state capable of transmitting/receiving a packet using the IPv4 HoA and the IPv6 HoA. Further it is premised that the UE 1 in that state performs a handover to a network supporting a single address type connection only (network of single address type connection).

FIG. 19 is a flowchart showing an exemplary processing flow by the UE 1 in Embodiment 4 of the present invention. Firstly, the UE 1 receives information on the handover generated based on the determination by the eNB from the first wireless communication unit 101. Thereafter, the information is transferred to the handover determination unit 103 via the packet processing unit 102, and the handover determination unit 103 of the UE 1 detects a handover. The UE 1 may transfer information on the handover to the handover determination unit 103 via the connection control unit 106 and detect a handover (Step S4001: Inter RAT handover).

After confirming that handover processing is performed, the connection control unit 106 issues an instruction to the PDN Type determination unit 104 so as to make the PDN Type determination unit 104 check whether the PDN Type allocated from the network after the handover is identical to the PDN Type (IPv4v6 PDN Type) before the handover. Since the UE 1 already establishes a multi-address type connection (PDN connection of the IPv4v6 PDN Type) before the handover this time, checking is performed as to whether the PDN connection is changed to the single address connection (PDN connection of IPv6 (IPv4) PDN Type) or not (Step S4002).

When the PDN Type is identical to the PDN Type that the UE 1 holds before the handover, any special processing is not performed and conventional processing after the handover is performed. On the other hand, when the PDN Type is different from the PDN Type before the handover, i.e., when the UE 1 has a PDN connection of the IPv4v6 PDN Type before the handover but a single address type connection such as an IPv6 PDN Type is allocated after the handover, the UE 1 performs message exchange with the PGW 5 or the like via the packet processing unit 102 and the first wireless communication unit 101 so as to perform UE requested PDN Connectivity Procedure as a temporary PDN connection establishment request. Thereby, a PDN connection of the IPv6 PDN type is newly established aside from the PDN connection of the IPv6 PDN Type established by the handover (Step S4011).

Subsequently, the UE 1 acquires a new IPv6 prefix from the PGW 5 and creates an IPv6 address (Step S4012). After a PDN connection is established, the connection control unit 106 of the UE 1 instructs the DNS client processing unit 105 to search for the address of the ePDG 8 (Step S4013). Herein when the address of the ePDG 8 can be acquired using other functions, the address of the ePDG 8 may be acquired without using the DNS client processing unit 105 or a DNS. For instance, the address of the ePDG 8 used during the connection to the N3G access 3 may be stored, and such an address of the ePDG 8 may be used.

The UE 1 acquiring the address of the ePDG 8 accesses the ePDG 8 via the PDN and starts processing to establish a PDN connection of the IPv4v6 PDN Type with the PGW 5. Firstly, the UE 1 instructs the packet processing unit 102 through the connection control unit 106 of the UE 1 to set the IPv4v6 PDN Type as the PDN Type as a parameter of the IKEv2 Authentication and Tunnel Setup message and create a message. Further the UE 1 instructs the packet processing unit 102 through the connection control unit 106 to set "handover" as the Request Type as a parameter of the message, the IP address that the UE 1 wants to maintain continuously in the IP Address field, when there is a bearer that the UE 1 wants to maintain continuously, the Bearer ID corresponding to the bearer in the Bearer ID field and Indication instructing to update these parameters with the EPS bearer context that the PGW 5 has in the Renew Indication field (Steps S4014 to S4017).

After the packet processing is completed, the UE 1 transmits the IKEv2 Authentication and Tunnel Setup message with the respective parameters set therein to the ePDG 8 (Step S4018). The order of the processing from Step S4014 to Step S4017 may be changed. When any means is available capable of informing the ePDG 8 of the parameters used in Step S4014 to Step S4017, such means may be used instead of the IKEv2 Authentication and Tunnel Setup message.

The network side changes the PDN Type of the PDN connection in the EPS bearer context from the IPv6 PDN to the IPv4v6 on the basis of the operator policy and the IKEv2 Authentication and Tunnel Setup message that the UE 1, transmits. Further, the address (in Embodiment 4, the IPv4 HoA) stored in the IP Address field of the IKEv2 Authentication and Tunnel Setup message Completing is changed to be available. Completing the updating processing of the EPS bearer context, the PGW 5 returns an updating result to the ePDG 8 as a PBA message. Finally, such a message is returned as an IKEv2 message from the ePDG 8 to the UE 1 via the PDN (Step S4019).

As a result, even after the UE 1 having the IPv4 HoA and the IPv6 HoA and in a state of holding a PDN connection of the IPv4v6 PDN Type performs a handover to a single address type network, the UE 1 can perform a communication while maintaining the PDN connection state before the handover.

Referring next to FIG. 20, the processing flow of the PGW 5 having the configuration shown in FIG. 4 is described below in detail, mainly describing the processing by the connection control unit 106 performing processing as a feature of the present invention. It is premised that the PGW 5 already accesses the 3G access 2 via the communication unit 501. Further it is premised that the PGW 5 in a state of transmitting/receiving a packet with the UE 1 already establishing a PDN connection of the IPv4v6 PDN Type performs a handover to a single address type network.

FIG. 20 is a flowchart showing an exemplary processing flow by the PGW in Embodiment 4 of the present invention. The following describes the present embodiment while referring to the same processing flow in the above Embodiment 3. Firstly, the PGW 5 receives a message on a handover of the UE 1 generated based on the determination by the eNB from the communication unit 501. Thereafter, the handover processing unit 503 of the PGW 5 process the handover of the UE 1 via the packet processing unit 502 and updates positional information on the UE 1 (Step S4501: Inter RAT handover). When an instruction is issued so as not to allocate the IPv4 HoA not allocated from the UE 1 to another UE 1 during the handover processing, the PGW 5 temporarily holds the IPv4 address without allocating the same to another UE 1.

Thereafter, the communication unit 501 of the PGW 5 receives a PDN connection establishment request. Then, the PGW 5 transfers the request to the PDN connection establishment processing unit 504 and establishes a PDN connection in accordance with the request. In Embodiment 4 of the present invention, the PGW 5 establishes a new PDN connection of an IPv6 PDN Type with the UE 1 (Step S4502).

Thereafter, the communication unit 501 of the PGW 5 receives a PBU message including a message for maintaining a PDN connection by the UE 1 transmitted from the ePDG 8 (Step S4503). Receiving the PBU message, the PGW 5 transfers the PBU message to the PDN connection establishment processing unit 504 via the packet processing unit 502 so as to check whether Renew Indication indicating updating of EPS bearer context of the UE 1 is stored in the PBU message or not (Step S4504).

When the PBU message does not store the Renew Indication, the PGW 5 does not perform any special processing, determines as a typical PDN connection request and performs conventional processing. On the other hand, when the PBU message stores the Renew Indication, the PGW 5 instructs the packet processing unit 502 from the connection control unit 506 to perform IP-CAN Session Establishment Procedure with the PCRF, and the IP-CAN Session Establishment Procedure is performed (Step S4511). Subsequently, the PGW 5 fetches the PDN Type and the IPv4 HoA stored in the PBU message received at the above Step 4503, and when a Bearer ID is stored, the Bearer ID from a predetermined field (Step S4512 to Step S4514). The processing order from Step S4512 to Step S4514 may be changed.

Thereafter, the PGW 5 adds the PDN Type, the IPv4 HoA and the Bearer ID fetched from the PBU message to P-GW context as connection information on the packet transmission/reception that the PGW 5 itself has for updating (Step S4515). Subsequently, the PGW 5 transmits a PGW identifier (PGW Identity) and an APN relating to the PDN connection of the UE 1 to the AAA/HSS server. This transmitted information is registered with the HSS (Step S4516). Subsequently, the PGW 5 stores a processing result of the PBU message transmitted from the ePDG 8 in a PBA message, and transmits the same to the ePDG 8 (Step S4517). Note here that the updating processing of the P-GW context performed at the above Step S4515 may be performed after the above Step S4516 ends. As a result, the PGW 5 establishes a PDN connection of the IPv4v6 PDN Type with the UE 1.

Referring next to FIG. 16, the processing flow of the ePDG 8 having the configuration shown in FIG. 6 is described below in detail, mainly describing the processing by the connection control unit 806 performing processing as a feature of the present invention. It is premised that the ePDG 8 already connects to the PGW 5 via the communication unit and via the core network 4 and is in a state capable of transmitting/receiving a packet including a PDN connection request (PDN connection establishment request) of the UE 1. Further it is premised that, in such a state, the UE 1 having a PDN connection of the IPv4v6 PDN Type performs a handover to a network of a single address type connection.

FIG. 16 is a flowchart showing an exemplary processing flow by the ePDG in Embodiment 4 of the present invention. The following describes the present embodiment while referring to the same processing flow in the above Embodiment 3. Firstly described is the case where the UE 1 having the IPv4v6 PDN Type and in a state of transmitting/receiving a packet using the IPv4 HoA and the IPv6 HoA performs a handover to a single address type connection network. Following processing performed to maintain a communication state before the handover, the communication unit 801 of the ePDG 8 receives an IKEv2 Authentication and Tunnel Setup message transmitted via the PDN (Step S3501).

The message received with the communication unit 801 is transferred from the communication unit 801 to the message determination unit 805 via the packet processing unit 802. Next, the message determination unit 805 determines what type of message the transmitted PBU message is (Step S3502). The UE 1 may report PDN connection request information (e.g., PDN Type) of the UE 1 using a new message, instead of the IKEv2 Authentication and Tunnel Setup message, and therefore there is a need to determine what type of message is transmitted.

When the received message is determined as a message concerning the PDN connection request, the message is transmitted from the message determination unit 805 to the packet processing unit 802 via the connection control unit 806. Next, the packet processing unit creates a PBU message (Step S3511). Parameters stored in the PBU message are basically the same as the parameters (e.g., PDN Type and APN) stored in the IKEv2 Authentication and Tunnel Setup message at Step S3511. However, when there is a parameter that the ePDG 8 especially wants to store, such a parameter can be stored.

The created PBU message is transferred from the packet processing unit 802 to the communication unit 801, and is transmitted to the PGW 5 (Step S3512). Thereafter, the ePDG 8 makes the communication unit 801 receive a PBA message as a response of the PBU message (Step S3513). The received PBA message is transferred from the communication unit 801 to the connection control unit 806 via the packet processing unit 802. Subsequently, checking is performed as to whether the PBU message is correctly processed or not based on the PBA message (Step S3521). When the message ends normally, the ePDG 8 instructs, from the connection control unit 806, the packet processing unit 802 to create an IKEv2 message, and the packet processing unit 802 creates the IKEv2 message (Step S3522). After creating the IKEv2 message, the IKEv2 message is transmitted via the PDN to the UE 1 from the packet processing unit 802 via the communication unit 801 as a response of the IKEv2 message (Step S3523).

When a communication path enabling packet transmission/reception is established between the UE 1 and the ePDG 8 (e.g., Untrusted N3G access 3), the ePDG 8 may make an inquiry to the route determination unit 803, prior to transmission of the IKEv2 message to the UE 1 via the PDN, as to whether a packet is to be transmitted directly to the UE 1 from the ePDG 8 or a packet is to be transmitted to the UE 1 via the PDN, and then may determine the route for transmission of the IKEv2 message. The selection of an optimum route for IKEv2 message transmission can reduce processing load on devices including the PGW 5 functioning at the 3G access 2 or can shorten transmission time of a packet.

The processing based on Embodiment 4 allows the UE 1 having the IPv4 HoA and the IPv6 HoA, being in a state of holding a PDN connection of the IPv4v6 PDN Type and performing a handover to a single address type connection network to maintain the IP addresses (corresponding to the IPv4 HoA and the IPv6 HoA) held before the handover without depending on the operator policy. That is, in Embodiment 4, the UE 1 can perform a handover to a single address type connection network without discarding the IPv4 HoA and without discarding a packet addressed to the IPv4 HoA. Thereby, the UE 1 can receive a packet received before the handover even on a network after the handover. Even when the UE 1 performs a handover again to a multi-address type connection supporting network, the UE 1 can maintain the IPv4v6 PDN connection and further can maintain the IPv4 HoA and the IPv6 HoA.

Embodiment 4 of the present invention describes the case where the IPv4 HoA allocated before the handover is abandoned or discarded. Actually, however, the IPv4 HoA is not allocated to another UE 1 for a predetermined time period and is in a state substantially to be preserved for the UE 1. Therefore, when the UE 1 requests re-allocation, the PGW 5 will allocate the same address to the UE 1 (re-allocation).

Embodiment 4 of the present invention only describes handover processing to a single address type network. However, when a handover is performed from a single address type network to a multi-address type connection network, or when a PDN connection is detached (abandoned or discarded), the UE 1 and the PGW 5 have to perform detach processing for the temporary PDN connection as well (refer to the above Non-Patent Document 1 and Non-Patent Document 2).

Note that each functional block used in the description of the above-stated embodiments may be typically implemented as a LSI that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used.

Further, if a technique for integrated circuit that replaces LSIs becomes available by the development of a semiconductor technique or derived techniques, functional blocks may be naturally integrated using such a technique. For instance, biotechnology may be applied thereto.

INDUSTRIAL APPLICABILITY

The present invention has the effects of enabling a mobile terminal establishing a plurality of communication paths using a plurality of IP address types with one or more communication interfaces, even when the mobile terminal performs a handover to a network permitting a single communication path with a single IP address type only, to establish a plurality of communication paths using a plurality of IP address types. The present invention is applicable to techniques used for allowing a mobile terminal establishing a plurality of communication paths using a plurality of IP address types with one or more communication interfaces to move between networks.

The invention claimed is:

1. A connection management method in a communication system comprising a mobile terminal capable of establishing a plurality of packet data connections using a plurality of Internet Protocol (IP) addresses; a packet data gateway establishing a packet data connection with the mobile terminal and a mobility management gateway managing connection information on a packet transmission/reception with the mobile terminal, the method being for managing connections when the mobile terminal performs a handover from a multi-address type connection network capable of establishing a packet exchange connection using a plurality of IP address types to a single address type connection network capable of establishing a communication path with a single IP address type only, the method comprising:

a detection step of detecting, by the mobile terminal, a handover from the multi-address type connection network to the single address type connection network;

a temporary connection establishment step of establishing, by the mobile terminal, on a basis of a result of the detection step, a temporary connection via a single address type connection network with the mobility management gateway to maintain a communication state before the handover;

a packet data gateway-to request transmission step of transmitting, by the mobile terminal, after the temporary connection establishment step, a request to maintain a packet data connection before the handover to the packet data gateway using the temporary connection;

a mobility management gateway-to request transmission step of determining, by the packet data gateway receiving the request, whether or not to transmit the received request to the mobility management gateway, and when the packet data gateway determines that the request is to be transmitted to the mobility management gateway, transmitting the received request to the mobility management gateway; and a modification step of modifying, by the mobility management gateway, the connection information on a packet transmission/reception with the mobile terminal on a basis of information included in the request.

2. The connection management method according to claim 1, wherein after the detection step, the mobile terminal determines whether a Packet Data Network (PDN) Type before the handover is identical to a PDN Type after the handover or not, and when the PDN Types are not identical to each other, the mobile terminal performs the temporary connection establishment step.

3. The connection management method according to claim 1, wherein in the temporary connection establishment step, a temporary connection is established with the mobility management gateway using an address different from an address that the mobile terminal currently uses.

4. The connection management method according to claim 1, wherein in the packet data gateway-to request transmission step, the mobile terminal transmits a request to the packet data gateway via a packet data network using the temporary connection.

5. The connection management method according to claim 1, wherein in the mobility management gateway-to request transmission step, when the packet data gateway determines that a message received from the mobile terminal is a message relating to a Packet Data Network (PDN) connection establishment request, the packet data gateway transmits the request to the mobility management gateway.

6. The connection management method according to claim 1, wherein in the modification step, the mobility management gateway modifies the connection information on a basis of information on a Packet Data Network (PDN) Type included in a message received from the packet data gateway.

7. A mobile terminal capable of establishing a plurality of packet data connections using a plurality of Internet Protocol (IP) addresses, the mobile terminal comprising:

a handover processor that receives information on a handover for detecting a handover from a multi-address type connection network capable of establishing a packet exchange connection using a plurality of IP address types to a single address type connection network capable of establishing a communication path with a single IP address type only;

a connection controller that initiates a procedure for establishing, on a basis of a result of the handover processor, a temporary connection via a single address type connection network with a mobility management gateway to maintain a communication state before the handover, the mobility management gateway managing connection information on a packet transmission/reception with the mobile terminal; and a packet processor that transmits, after the temporary connection is established, a request to maintain a packet data connection before the handover to a packet data gateway using the temporary connection, the packet data gateway establishing a packet data connection with the mobile terminal.

8. The mobile terminal according to claim 7, wherein the handover processor determines, after detection of a handover, whether or not a Packet Data Network (PDN) Type before the handover is identical to a PDN Type after the handover, and when the PDN Types are identical to each other, instructs the connection controller to establish a temporary connection.

9. The mobile terminal according to claim 7, wherein the connection controller establishes a temporary connection with the mobility management gateway using an address different from an address that the mobile terminal currently uses.

10. The mobile terminal according to claim 7, wherein the packet processor enables the mobile terminal to transmit a request to the packet data gateway via a packet data network using the temporary connection.

11. The mobile terminal according to claim 7, wherein the packet processor incorporates a Packet Data Network (PDN) Type before the handover in a request to maintain a packet data connection before the handover.

12. The mobile terminal according to claim 7, wherein the packet processor incorporates Renew Indication before the handover in a request to maintain a packet data connection before the handover.

13. The mobile terminal according to claim 7, wherein the connection controller acquires, before the temporary connection is established, an address different from an address that the mobile terminal currently uses.

14. The mobile terminal according to claim 7 wherein the handover processor instructs the mobility management gateway so as not to discard an Internet Protocol (IP) address used before the handover for a certain time period during message exchange for a handover to a single address type connection network.

15. A packet data gateway establishing a packet data connection with a mobile terminal capable of establishing a plurality of packet data connections using a plurality of Internet Protocol (IP) addresses, the packet data gateway comprising:
 a receiver that receives a request transmitted by the mobile terminal, the mobile terminal performing a handover from a multi-address type connection network capable of establishing a packet exchange connection using a plurality of IP address types to a single address type connection network capable of establishing a communication path with a single IP address type only, and the request being transmitted from the mobile terminal using a temporary connection established via the single address type connection network;
 a message processor that refers to the received request for determining whether or not to transmit the received request to a mobility management gateway managing connection information on a packet transmission/reception with the mobile terminal; and
 a packet processor that transmits, when the message processor determines that the received request is to be transmitted, the received request to the mobility management gateway.

16. The packet data gateway according to claim 15, wherein the message processor determines whether or not to transmit a request to the mobility management gateway on a basis of a parameter of an Internet Key Exchange (IKEv2) Authentication and Tunnel Setup message that is a request received from the mobile terminal.

17. The packet data gateway according to claim 16, wherein the parameter of the Internet Key Exchange (IKEv2) Authentication and Tunnel Setup message is Renew Indication.

18. The packet data gateway according to claim 16, wherein the parameter of the Internet Key Exchange (IKEv2) Authentication and Tunnel Setup message is Packet Data Network (PDN) Type.

19. The packet data gateway according to claim 15, wherein
 the packet processor transmits a request to the mobility management gateway to an address of the mobility management gateway included in the request received from the mobile terminal.

\* \* \* \* \*